United States Patent
Gans et al.

(10) Patent No.: US 12,441,105 B2
(45) Date of Patent: Oct. 14, 2025

(54) LINE WIDTH CONTROL AND TRAJECTORY PLANNING FOR ROBOT GUIDED INKJET DEPOSITION

(71) Applicant: Board of Regents, the University of Texas System, Austin, TX (US)

(72) Inventors: Nicholas R. Gans, Plano, TX (US); Bashir H. Jafari, Dallas, TX (US)

(73) Assignee: Board of Regents, the University of Texas System, Austin, TX (US)

( * ) Notice: Subject to any disclaimer, the term of this patent is extended or adjusted under 35 U.S.C. 154(b) by 510 days.

(21) Appl. No.: 17/931,243

(22) Filed: Sep. 12, 2022

(65) Prior Publication Data

US 2023/0019331 A1    Jan. 19, 2023

Related U.S. Application Data

(62) Division of application No. 16/913,651, filed on Jun. 26, 2020, now Pat. No. 11,440,317.

(Continued)

(51) Int. Cl.
  *B41J 2/045*    (2006.01)
  *B41J 3/407*    (2006.01)
  (Continued)

(52) U.S. Cl.
  CPC ....... *B41J 2/04586* (2013.01); *B41J 2/04593* (2013.01); *B41J 3/4073* (2013.01);
  (Continued)

(58) Field of Classification Search
  CPC ................ B41J 2/04586; B41J 2/04593; B41J 2/04508; B41J 2/04505; B41J 2/04558;
  (Continued)

(56) References Cited

U.S. PATENT DOCUMENTS

| | | | | |
|---|---|---|---|---|
| 8,941,651 B2 * | 1/2015 | Trojanova | ............ | G06V 20/647 345/419 |
| 2005/0219283 A1 * | 10/2005 | Kachi | ................ | B41J 29/393 347/6 |

(Continued)

FOREIGN PATENT DOCUMENTS

| | | | | |
|---|---|---|---|---|
| CA | 2891021 A1 * | 1/2014 | .......... | B29C 64/141 |
| CN | 103810271 A * | 5/2014 | ............. | G06T 17/30 |
| WO | WO-2018191035 A1 * | 10/2018 | ........... | B29C 64/393 |

OTHER PUBLICATIONS

V. Lakafosis, A. Rida, R. Vyas, L. Yang, S. Nikolaou, and M. Tentzeris, "Progress towards the first wireless sensor networks consisting of inkjet-printed, paper-based rfid-enabled sensor tags," Proceedings of the IEEE, vol. 98, No. 9, pp. 1601-1609, 2010.

(Continued)

*Primary Examiner* — Jeffrey P Aiello
(74) *Attorney, Agent, or Firm* — Meunier Carlin & Curfman LLC

(57) ABSTRACT

In an embodiment, a method for controlling a printer is provided. The method includes: receiving a set of parameters associated with a printer by a computing device, wherein the printer is depositing ink on a substrate to generate a line; measuring a width of the line by the computing device; receiving a duty cycle associated with the printer by the computing device; using the received duty cycle, the set of parameters, and a model, estimating one or more unknown parameters of the set of parameters by the computing device; receiving a desired width of the line by the computing device; and if the desired width is not the same as the measured width: adjusting the duty cycle associated with the printer based on the set of parameters and the model so that the measured width is closer to the desired width by the computing device.

17 Claims, 14 Drawing Sheets

Related U.S. Application Data

(60) Provisional application No. 62/868,334, filed on Jun. 28, 2019.

(51) Int. Cl.
  G06K 15/02 (2006.01)
  G06T 17/00 (2006.01)
  H04N 1/387 (2006.01)

(52) U.S. Cl.
  CPC .......... *G06K 15/1868* (2013.01); *G06T 17/00* (2013.01); *H04N 1/387* (2013.01); *B41J 2202/21* (2013.01)

(58) Field of Classification Search
  CPC .... B41J 2/0451; B41J 2202/21; B41J 3/4073; B41J 3/4075; B41J 3/4076; B41J 3/4078; B41J 3/40733; G06K 15/1868; G06T 17/00; G06T 17/20; G06T 17/30; H04N 1/387; H04N 1/32101; H04N 1/00278; G06F 3/1229; G06F 18/00; G06N 20/00; G06V 10/82; G06V 10/7784; Y10T 29/49401
  USPC ......... 347/1, 2, 6, 17, 19, 84; 358/502, 504; 382/141, 258; 700/110, 108; 702/94, 95, 702/96, 98, 100, 97, 105, 188, 184, 182, 702/85
  See application file for complete search history.

(56) References Cited

U.S. PATENT DOCUMENTS

| | | | |
|---|---|---|---|
| 2014/0285558 A1* | 9/2014 | Wada | B41M 5/00 347/14 |
| 2018/0201014 A1* | 7/2018 | Ohnishi | B41J 2/04581 |

OTHER PUBLICATIONS

G. Shaker, S. Safavi-Naeini, N. Sangary, and M. Tentzeris, "Inkjet printing of ultrawideband (uwb) antennas on paper-based substrates," IEEE Antennas and Wireless Propagation Letters, vol. 10, pp. 111-114, 2011.
M. Shtein, P. Peumans, J. Benziger, and S. Forrest, "Direct, mask- and solvent-free printing of molecular organic semiconductors," Advanced Materials, vol. 16, No. 18, pp. 1615-1620, 2004.
S.-C. Chang, J. Liu, J. Bharathan, Y. Yang, J. Onohara, and J. Kido, "Multicolor organic light-emitting diodes processed by hybrid inkjet printing," Advanced Materials, vol. 11, No. 9, pp. 734-737, 1999.
S. R. Forrest, "The path to ubiquitous and low-cost organic electronic appliances on plastic," Nature, vol. 428, No. 6986, pp. 911-918, 2004.
D. Silva, D. Wallace, P. Cooley, D. Radulescu, and D. Hayes, "An inkjet printing station for neuroregenerative tissue engineering," in IEEE Engineering in Medicine and Biology Workshop, pp. 71-73, 2007.
B. Lorber, W.-K. Hsiao, I. M. Hutchings, and K. R. Martin, "Adult rat retinal ganglion cells and glia can be printed by piezoelectric inkjet printing," Biofabrication, vol. 6, No. 1, p. 015001, 2014.
T. Burg, R. Groff, K. Burg, M. Hill, and T. Boland, "Systems engineering challenges in inkjet biofabrication," in SoutheastCon, 2007. Proceedings. IEEE, pp. 395-398, 2007.
K. Kordas, T. Mustonen, G. T'oth, H. Jantunen, M. Lajunen, C. Soldano, S. Talapatra, S. Kar, R. Vajtai, and P. M. Ajayan, "Inkjet printing of electrically conductive patterns of carbon nanotubes," Small, vol. 2, No. 8-9, pp. 1021-1025, 2006.
P. Jensfelt, E. Forell, and P. Ljunggren, "Field and service applications— automating the marking process for exhibitions and fairs—the making of harry platter," IEEE Robotics Automation Magazine, vol. 14, No. 3, pp. 35-42, 2007.

S. Mishra, K. Barton, and A. Alleyne, "Control of high-resolution electrohydrodynamic jet printing," in American Control Conference, pp. 6537-6542, 2010.
M. Ezzeldin, P. van den Bosch, and S.Weiland, "Toward better printing quality for a drop-on-demand ink-jet printer: improving performance by minimizing variations in drop properties," IEEE Control Systems, vol. 33, No. 1, pp. 42-60, 2013.
A. Khalate, X. Bombois, G. Scorletti, R. Babuska, S. Koekebakker, and W. de Zeeuw, "A waveform design method for a piezo inkjet printhead based on robust feedforward control," Journal of Microelectromechanical Systems, vol. 21, No. 6, pp. 1365-1374, 2012.
T. K. Nguyen, V. D. Nguyen, D. Byun, and J. ParkN, "Stabilizing meniscus shape to improve pattern uniformity in drop-on-demand ehd inkjet printing using visual feedback," in International Conference on Control, Automation and Systems, pp. 392-394, 2012.
Z. Ye, Y. He, R. Pieters, B. Mesman, H. Corporaal, and P. Jonker, "Demo: An embedded vision system for high frame rate visual servoing," in ACM/IEEE International Conference on Distributed Smart Cameras, pp. 1-2, 2011.
J. van Helvoort, B. de Jager, and M. Steinbuch, "Data-driven controller unfalsification with analytic update applied to a motion system," IEEE Transactions on Control Systems Technology, vol. 16, No. 6, pp. 1207-1217, 2008.
H. Y. Lin, M. C. Lu, J. H. Horng, T. B. Yang, S. C. Hsieh, C. Y. Hsiao, H. M. Tai, and J. Chen, "Dc servo speed control of an inkjet print head transport system using a phase-locked loop," in Proceedings International Workshop on Advanced Motion Control, vol. 2, pp. 458-463 vol. 2, 1996.
C. Chen, C. Cheng, and G.-C. Chiu, "Adaptive robust control of media advance systems for thermal inkjet printers," Mechatronics, vol. 10, No. 12, pp. 111-126, 2000.
D. Myers, Wetting and Spreading, pp. 415-447. John Wiley & Sons, Inc., 2002.
D. Bonn, J. Eggers, J. Indekeu, J. Meunier, and E. Rolley, "Wetting and spreading," Rev. Mod. Phys., vol. 81, pp. 739-805, May 2009.
T. Young, "An essay on the cohesion of fluids," Philosophical transactions, 1805.
D. Quere M .- J. Azzopardi, and L. Delattre, "Drops at rest on a tilted plane," Langmuir, vol. 14, No. 8, pp. 2213-2216, 1998.
van Kogelenberg, et al., "Three-Dimensional Printing and Cell Therapy for Wound Repair", Advances in Wound Care, vol. 7, No. 5, 145-155.
Hosseini Jafari, Bashir, et al. "Geometric Trajectory Planning for Robot Motion Over a 3D Surface." Dynamic Systems and Control Conference. Vol. 59162. American Society of Mechanical Engineers, 2019.
Hosseini Jafari, Bashir, et al., "A Robot System for Automated Wound Filling with Jetted Materials", 2018 IEEE/RSJ International Conference on Intelligent Robots and Systems (IROS) Madrid, Spain, Oct. 1-5, 2018.
Li, et al., "Development of a Robotic Arm Based Hydrogel Additive Manufacturing System for In-Situ Printing", Appl. Sci. 2017, 7, 73; doi:10.3390/app7010073.
E. Galceran and M. Carreras, "A survey on coverage path planning for robotics," Robotics and Autonomous Systems, vol. 61, No. 12, pp. 1258-1276, 2013.
E. Horvatha, C. Pozna, and R.-E. Precup, "Robot coverage path planning based on iterative structured orientation," Acta Polytechnica Hungarica, vol. 15, No. 2, 2018.
C. Di Franco and G. C. Buttazzo, "Energy-aware coverage path planning of uavs.," in IEEE International Conference on Autonomous Robot Systems and Competitions, pp. 111-117, 2015.
T. Oksanen and A. Visala, "Coverage path planning algorithms for agricultural field machines," Journal of Field Robotics, vol. 26, No. 8, pp. 651-668, 2009.
F. Yasutomi, M. Yamada, and K. Tsukamoto, "Cleaning robot control," in IEEE International Conference on Robotics and Automation, pp. 1839-1841, 1988.
M. Bosse, N. Nourani-Vatani, and J. Roberts, "Coverage algorithms for an under-actuated car-like vehicle in an uncertain environment," in IEEE International Conference on Robotics and Automation, pp. 698-703, 2007.

(56) References Cited

OTHER PUBLICATIONS

Z. L. Cao, Y. Huang, and E. L. Hall, "Region filling operations with random obstacle avoidance for mobile robots," Journal of Robotic Systems, vol. 5, No. 2, pp. 87-102, 1988.

P. N. Atkar, A. Greenfield, D. C. Conner, H. Choset, and A. A. Rizzi, "Uniform coverage of automotive surface patches," The International Journal of Robotics Research, vol. 24, No. 11, pp. 883-898, 2005.

P. Hertling, L. Hog, R. Larsen, J. W. Perram, and H. G. Petersen, "Task curve planning for painting robots. i. process modeling and calibration," IEEE Transactions on Robotics and Automation, vol. 12, pp. 324-330, Apr. 1996.

B. H. Jafari, N. Lee, B. Antohe, and N. Gans, "Parameter estimation and line width control of robot guided inkjet deposition," in American Control Conference, pp. 918-924, Jun. 2018.

H. Biermann, I. Martin, F. Bernardini, and D. Zorin, "Cut-and-paste editing of multiresolution surfaces," in ACM Transactions on Graphics, vol. 21, pp. 312-321, 2002.

V. Kraevoy and A. Sheffer, "Template-based mesh completion.," in Symposium on Geometry Processing, vol. 385, pp. 13-22, 2005.

Y. Lin, C. Ni, N. Lei, X. D. Gu, and J. Gao, "Robot coverage path planning for general surfaces using quadratic differentials," in IEEE International Conference on Robotics and Automation, pp. 5005-5011, May 2017.

M. S. Floater and K. Hormann, "Surface parameterization: a tutorial and survey," in Advances in multiresolution for geometric modelling, pp. 157-186, Springer, 2005.

H. Choset, "Coverage of known spaces: The boustrophedon cellular decomposition," Autonomous Robots, vol. 9, No. 3, pp. 247-253, 2000.

S. Flory and M. Hofer, "Constrained curve fitting on manifolds," Computer-Aided Design, vol. 40, No. 1, pp. 25-34, 2008.

S.-M. Hu and J. Wallner, "A second order algorithm for orthogonal projection onto curves and surfaces," Computer Aided Geometric Design, vol. 22, No. 3, pp. 251-260, 2005.

B. H. Jafari, L. Namhyung, R. Thompson, J. Schellhorn, B. Antohe, and N. Gans, "A robot system for automated wound filling with jetted materials," in 2018 IEEE/RSJ International Conference on Intelligent Robots and Systems (IROS), pp. 1789-1794, Oct. 2018.

"Burn incidence and treatment in the united states: 2013 fact sheet." http://www.ameriburn.org/resources factsheet.php.

"Skin cancer facts." http://www.skincancer.org/skin-cancerinformation/skin-cancer-facts.

I. Rodrigues and M.-F. M'egie, "Prevalence of chronic wounds in quebec home care: an exploratory study," Ostomy/wound management, vol. 52, No. 5, pp. 46-48, 2006.

C. K. Sen, G. M. Gordillo, S. Roy, R. Kirsner, L. Lambert, T. K. Hunt, F. Gottrup, G. C. Gurtner, and M. T. Longaker, "Human skin wounds: a major and snowballing threat to public health and the economy," Wound Repair and Regeneration, vol. 17, No. 6, pp. 763-771, 2009.

R. A. Clark, K. Ghosh, and M. G. Tonnesen, "Tissue engineering for cutaneous wounds," Journal of Investigative Dermatology, vol. 127, No. 5, pp. 1018-1029, 2007.

A. Shah, C. Wollak, and J. Shah, "Wound measurement techniques: comparing the use of ruler method, 2d imaging and 3d scanner," Journal of the American College of Clinical Wound Specialists, vol. 5, No. 3, pp. 52-57, 2013.

D. M. Wendland and D. W. Taylor, "Wound measurement tools and techniques: A review," Journal of Acute Care Physical Therapy, vol. 8, No. 2, pp. 42-57, 2017.

D. M. Kirchmajer, R. Gorkin III, et al., "An overview of the suitability of hydrogel-forming polymers for extrusion-based 3d-printing," Journal of Materials Chemistry B, vol. 3, No. 20, pp. 4105-4117, 2015.

P. Gholami, M. A. Ahmadi-pajouh, N. Abolftahi, G. Hamarneh, and M. Kayvanrad, "Segmentation and measurement of chronic wounds for bioprinting," IEEE Journal of Biomedical and Health Informatics, vol. PP, No. 99, pp. 1-1, 2017.

T. Bahls, F. A. Frhlich, A. Hellings, B. Deutschmann, and A. O. Albu-Schffer, "Extending the capability of using a waterjet in surgical interventions by the use of robotics," IEEE Transactions on Biomedical Engineering, vol. 64, No. 2, pp. 284-294, 2017.

J. J. O'Neill, R. A. Johnson, R. L. Dockter, and T. M. Kowalewski, "3D bioprinting directly onto moving human anatomy," in IEEE/RSJ International Conference on Intelligent Robots and Systems, pp. 934-940, 2017.

Z. Zhu, S.-Z. Guo, T. Hirdler, C. Eide, X. Fan, J. Tolar, and M. C. McAlpine, "3d printed functional and biological materials on moving Freeform surfaces," Advanced Materials, vol. 30, No. 23, p. 1707495, 2018.

H. Pickett, "Shave and punch biopsy for skin lesions," American family physician, vol. 84, No. 9, p. 995, 2011.

R. B. Rusu and S. Cousins, "3D is here: Point Cloud Library (PCL)," in IEEE International Conference on Robotics and Automation (ICRA), (Shanghai, China), May 9-13, 2011.

M. Quigley, K. Conley, B. Gerkey, J. Faust, T. Foote, J. Leibs, R. Wheeler, and A. Y. Ng, "Ros: an open-source robot operating system," in ICRA workshop on open source software, vol. 3, p. 5, 2009.

K. Pulli, A. Baksheev, K. Kornyakov, and V. Eruhimov, "Real-time computer vision with opencv," Communications of the ACM, vol. 55, No. 6, pp. 61-69, 2012.

M.-K. Hu, "Visual pattern recognition by moment invariants," IRE transactions on information theory, vol. 8, No. 2, pp. 179-187, 1962.

B. Jafari, N. Lee, B. Antohe, and N. Gans, "Parameter estimation and line width control of robot guided inkjet deposition," in 2018 American Controls Conference, 2018.

\* cited by examiner

200

LINE WIDTH CONTROL AND TRAJECTORY PLANNING FOR ROBOT GUIDED INKJET DEPOSITION

CROSS-REFERENCE TO RELATED APPLICATIONS

This application is a divisional of U.S. patent Ser. No. 16/913,651, filed on Jun. 26, 2020, entitled "LINE WIDTH CONTROL AND TRAJECTORY PLANNING FOR ROBOT GUIDED INKJET DEPOSITION", which claims the benefit of priority to U.S. Provisional Patent Application No. 62/868,334, filed on Jun. 28, 2019, entitled "PARAMETER ESTIMATION AND LINE WIDTH CONTROL OF ROBOT GUIDED INKJET DEPOSITION." The contents of both are hereby incorporated by reference in their entirety.

STATEMENT REGARDING FEDERALLY SPONSORED RESEARCH OR DEVELOPMENT

This invention was made with government support under award abstract numbers 1933558 and 1563424 awarded by the National Science Foundation. The government has certain rights in the invention.

BACKGROUND

Inkjet deposition (or inkjet printing) refers to multiple technologies to deposit liquids on a substrate. Depositing of various liquid materials has been reported for many applications. Conductive ink has been used to print low-cost antennas on a paper substrate. Organic semiconductors have been printed to create transistors and displays. Inkjet deposition has been used to deposit nerve regeneration conduits, biomaterials and tissues. Solutions of carbon nanotubes have been inkjet printed. A mobile robot equipped with laser scanner and inkjet printer head has been used to autonomously navigate a building and mark structures.

While such applications for inkjet deposition are useful, there is a lack of knowledge regarding how to regulate the placement of a liquid material (e.g., ink) on a substrate (e.g., paper, human tissue, vehicle bodies, etc.) based on changes to drop volume. Current methods for placement regulation rely on different techniques such as position and velocity control, feed-forward control, and meniscus control, each of which is associated with drawbacks.

Furthermore, there are a number of applications that require precise motion planning along a desired trajectory on or over a curved surface, including mobile robots and UAVs conducting coverage path planning, agricultural field automation, vacuum cleaning robots, lawn mowers, etc. There is a particular interest in printing or jetting materials onto curved surfaces, with application in painting robots, printing antennas and printing biological materials. Defining or mapping a specific trajectory to curved surfaces is challenging, and this challenge is increased when the trajectory must pass over specific points and/or remain bounded in a desired region.

SUMMARY

In a first aspect, systems and methods for dynamically controlling the line width of a printer is provided. To achieve this, embodiments may include some or all of the following three components. First, a dynamic model of line width as a function of parameters such as changing duty cycle, nozzle velocity, and the contact angle arising from chemical and physical properties of the liquid (e.g., ink) and surface (e.g., paper) is created. The model may take as an input a current or voltage duty cycle and may output the estimated line width. The model may then be used to obtain control-affine dynamics.

However, as may be appreciated, many of the parameters needed for the model (e.g., terms in the dynamic equation) may be unknown or difficult to measure. As a second component, a nonlinear estimator is used to determine the cumulative uncertainties of the parameters as a single parameter. This single parameter may then be used by the model to estimate line width based on the duty cycle.

The third component is the use of a nonlinear control law to regulate drop diameter. The combination of the three components is a closed-loop regulation of printed line width that operates without any knowledge of the interactions between liquid and surface. This combination of components is robust with respect to parameter error, which guarantees ultimate convergence of error to a known maximum value. In some embodiments, the upper bound for the error may depend on control gain and a difference between real and estimated parameter values. Stability of the estimator and control law may be established through Lyapunov Analysis.

In another aspect, systems and methods for printing a 2D pattern or image on a 3D surface are provided. Part of this approach is the use of constrained optimization to find a surface parametrization that preservers the shape of a desired curve or trajectory from 2D onto a 3D surface. Surface parametrization can be considered as a mapping from a surface to a parametric domain in lower dimensions. Surfaces that are homomorphic to a disk have a parameter space in the 2D plane. This concept lets us map a curve or trajectory defined in 2D to a geometric shape in 3D space. This mapping can result in distortion in the shape and size of the curve. As we want the pattern on the surface to be similar to the original 2D pattern, isometric (length preserving) and conformal (angle preservative) mappings are desirable to minimize distortion.

In an embodiment, a method for controlling a printer is provided. The method includes: receiving a set of parameters associated with a printer by a computing device, wherein the printer is depositing ink on a substrate to generate a line; measuring a width of the line by the computing device; receiving a duty cycle associated with the printer by the computing device; using the received duty cycle, the set of parameters, and a model, estimating one or more unknown parameters of the set of parameters by the computing device; receiving a desired width of the line by the computing device; and if the desired width is not the same as the measured width: adjusting the duty cycle associated with the printer based on the set of parameters and the model so that the measured width is closer to the desired width by the computing device.

In an embodiment, a method for printing a 2D pattern on a 3D surface is provided. The method includes receiving a 2D pattern by a computing device; receiving a point cloud of a 3D surface by the computing device, wherein the point cloud comprises a plurality of points; selecting a subset of the points of the point cloud by the computing device; and generating a mapping of the 2D pattern to the subset of points by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The components in the drawings are not necessarily to scale relative to each other. Like reference numerals designate corresponding parts throughout the several views.

DETAILED DESCRIPTION

I. Parameter Estimation and Line Width Control of Robot Guided Inkjet Deposition

A. Ink-Jet Printing Model Derivation

As described herein, a small amount of liquid in the air having recently left a jetting nozzle of a printer is referred to as a drop, while the liquid in contact with a surface is referred to as a spot. A spot deposited on a solid substrate will flatten and spread. The degree to which a drop of liquid spreads on a solid surface is referred to as wetting. Wetting is a complex phenomenon dependent on the chemical properties of the liquid, solid surface and surrounding air, physical properties of the solid such as surface roughness, temperature, and possible contamination such as dirt, oil, etc. Drop volume has the strongest influence on spot size, followed by fluid viscosity and surface interactions. Drop velocity and impact dynamics are generally negligible for small drops if the impact is normal to the surface. Note while the disclosed systems and methods are described with respect to depositing or printing ink on surfaces, it is for illustrative purposes only. The disclosed systems and methods can be used to print, write, or deposit materials such as liquids or gels on a variety of surfaces.

A second factor influencing line width is drop-to-drop spacing. Constant velocity of the nozzle of the printer mitigates changes in line width due to spacing. Single spot diameter determined by wetting defines the minimum line width, and reduction in spacing between drops/spots increases the line width.

Figure 1:
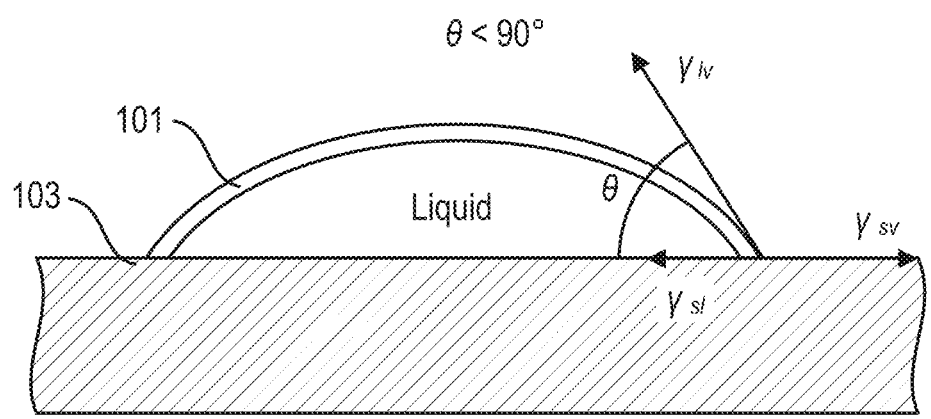
FIG. 1 is an illustration of a spot on a level surface.

Wetting is typically studied in terms of contact angles (FIG. 1), which describe the shape of a spot 101 on a level surface 103. Small contact angles ($\theta$<90°) indicate high wetting and large spread, while large angles indicate low wetting and little spread. Young's equation gives the contact angle $\theta$ at equilibrium as a function of the liquid-vapor, solid-vapor, and solid-liquid interfacial tensions ($\gamma_{lv}$, $\gamma_{sv}$ and $\gamma_{sl}$ respectively)

$$\cos\theta = \frac{\gamma_{sv} - \gamma_{sl}}{\gamma_{lv}}.$$

The diameter of a spot on the surface, as viewed from above, can be described as a function of the spot volume V and contact angle. Depending on $\theta$, the diameter d is $$\text{If } \theta < 90°, d = 2\left(\frac{3}{\pi}\right)^{1/3} \frac{\sin\theta}{(2+\cos\theta)^{1/3}(1-\cos\theta)^{2/3}} V^{1/3} \quad (1)$$

$$\text{If } \theta > 90°, d = 2\left(\frac{3}{\pi}\right)^{1/3} \frac{1}{(2+\cos\theta)^{1/3}(1-\cos\theta)^{2/3}} V^{1/3}.$$

Given accurate knowledge of the material properties, it is possible to estimate $\theta$ off-line and determine the correct volume for a drop to give a desired diameter. While research has gone into control to correctly generate the desired volume, if there is error in the estimate of $\theta$, the diameter will be incorrect. Given a desired spot diameter $d_d$, the error in spot diameter is defined as $e(t)=d(t)-d_d(t)$. Consider the case of $\theta$<90°, and assume $\theta$ is constant. The change of spot diameter is a function of the drop volume:

$$\dot{d} = \frac{dd}{dV}\frac{dV}{dt} = \frac{\frac{2}{3}\left(\frac{3}{\pi}\right)^{1/3}\sin\theta V^{-\frac{2}{3}}}{(2+\cos\theta)^{1/3}(1-\cos\theta)^{2/3}}\dot{V}. \quad (2)$$

Collecting the constant terms as $$\beta = \frac{\frac{2}{3}\left(\frac{3}{\pi}\right)^{1/3}\sin\theta}{(2+\cos\theta)^{1/3}(1-\cos\theta)^{2/3}} \quad (3)$$

the relationship between $\dot{d}$ and $\dot{V}$ can be written as $$\dot{d} = \beta V^{-\frac{2}{3}}\dot{V}. \quad (4)$$

Equation (1) also can be represented as $$d = 3\beta V^{\frac{1}{3}} \quad (5)$$

or $$V = \left(\frac{d}{3\beta}\right)^3. \quad (6)$$

By substituting (6) in (4) we obtain $$\dot{d} = 9\frac{\beta^3}{d^2}\dot{V}. \quad (7)$$

Consider D(t) as valve duty cycle and estimate the model between $\dot{V}(t)$ and $\dot{D}(t)$ for a specific range of duty cycle as the linear equation (8). Note that in some embodiments, rather than valve duty cycle voltage, a current duty cycle of a DC motor could be used, as well as proportional current of an AC motor. Equation (8) is $$\dot{V}(t) = a\dot{D}(t) \tag{8}$$

in which case $\dot{d}(t)$ can be written as $$\dot{d} = 9\frac{\beta^3}{d^2}\alpha\dot{D}(t) \tag{9}$$

or $$\dot{d} = \frac{b}{d^2}\dot{D}(t) \tag{10}$$

where $b = 9\beta^3\alpha$. To give (10) a control affine form, we design $\dot{D}$ as $$\dot{D} = ad^3 + d^2u, a > 0 \tag{11}$$

with u as our new virtual input and a as a parameter that can be chosen by the user to determine the speed of the dynamics. Using (11), we transform (10) to $$\dot{d} = abd + bu \tag{12}$$

Note that b encapsulates all unknown parameters and depends on surface and liquid characteristics. We assume that b is constant for a fixed surface, liquid and valve.

Our final model is then $$\dot{d} = abd + bu = b(ad+u) = bf(d,u)$$
$$y = d. \tag{13}$$

where u can be converted to the real input based on (11).

B. Parameter Estimation and Tracking Control of Drop Spread

In this section, a new, exponentially fast estimation approach is introduced to learn parameters in a class of nonlinear systems. Taking advantage of this knowledge, a Lyapunov-based tracking control is also applied in parallel with the estimation phase to follow the desired value.

1. Preliminaries

Definition 1. A set $S \subset \mathbb{R}$ is called measure zero if $$\forall \epsilon > 0, \exists \{I_k\}_{k=1}^{\infty}, s.t. S \subseteq \cup_k I_k \text{ and } \Sigma_k l(I_k) < \epsilon, \tag{14}$$

where $I_k := (a_k, b_k) \subset \mathbb{R}$ are open intervals with length $l(I_k) := b_k - a_k$. In other words, if the sum of the lengths of intervals enclosing all elements of S can be made arbitrarily small, a finite set of points is of measure zero.

2. Parameter Estimation Approach

Theorem 1. For a nonlinear system, we define a dynamic model as $$\dot{d} = \hat{b}f(d,u) \tag{15}$$

where $\hat{b}(t) \in \mathbb{R}$ is an estimate of constant $b \neq 0$; furthermore, $\hat{b}(t)$ is updated according to the following rule $$\dot{\hat{b}} = -k_1\hat{b} + k_2 s, \tag{16}$$

where $k_1, k_2 \in \mathbb{R}_+$ are positive scalar gains, and s is given by $$s := \begin{cases} \int_0^t (\dot{d} - \dot{\hat{d}})f^{-1}(d,u)d\tau & \text{if } f(d,u) \neq 0 \\ 0 & \text{if } f(d,u) = 0. \end{cases} \tag{17}$$

If the set of times $\mathcal{T} = \{t \in \mathbb{R} \mid f(d,u) = 0\}$ is a measure zero set, then exponentially converges to b from any initial value. Furthermore, if $k_1^2 > 4k_2$, and $\hat{b}$ has initial condition $\hat{b}(t_0) > 0$, then $\hat{b}$ will never equal 0.

Proof. Define our estimation error as $$e_b = b - \hat{b}. \tag{18}$$

Taking the time derivative of $e_b$ gives $$\dot{e}_b = -\dot{\hat{b}}. \tag{19}$$

Replacing (16) in (19)

$$\dot{e}_b = k_1\hat{b} - k_2 s. \tag{20}$$

Replacing s from (17) when $t \notin \mathcal{T}$ (i.e., when $f(d,u) \neq 0$) gives dynamics $$\dot{e}_b = k_1\hat{b} - k_2 \int_0^t (\dot{d} - \dot{\hat{d}})f^{-1}(d,u)d\tau \tag{21}$$

$$= k_1\hat{b} - k_2 \int_0^t e_b f(d,u)f^{-1}(d,u)d\tau$$

$$= k_1\hat{b} - k_2 \int_0^t e_b d\tau.$$

Taking another time derivative of (21) and replacing $\dot{\hat{b}}$ with (19) gives $$\ddot{e}_b k_1 \dot{e}_b k_2 e_b = 0. \tag{22}$$

Because $k_1, k_2 > 0$, then $e_b$ exponentially converges to zero and $\hat{b}$ converges to b.

For $t \in \mathcal{T}$, replacing s from (17) in (16), when $f(d,u) = 0$, the dynamics are given by $$\dot{\hat{b}} = -k_1\hat{b} \tag{23}$$

which guarantees $\hat{b}(t)$ does not jump or increase $\forall t \in \mathcal{T}$. Considering (18) and that b is constant, $e_b$ also does not jump or increase $\forall t \in \mathcal{T}$. As the set of times $\mathcal{T}$ is measure zero, those set of times do not contribute to the solution of $e_b(t)$, and $e_b$ exponentially converges to zero based on (22). Furthermore, if $k_1^2 > 4k_2$, the system described in (22) is overdamped and will not overshoot or experience oscillations. As $b > 0$, $\hat{b}$ with initial condition $\hat{b}(t_0) > 0$ will converge to b without crossing 0.

Note that it is possible to estimate $\dot{d}$ in (17) using a variety of methods. While a backwards difference estimate is generally susceptible to sensor noise, in our case the estimate is immediately integrated, which provides filtering and mitigates noise. Our experimental results use backwards difference and do not show obvious ill effects.

3. Tracking Control Under Stable Parameter Estimation

Let the system in (13) be rearranged to $$\dot{d} = bf(d,u) = [b \quad b]\begin{bmatrix} ad \\ u \end{bmatrix} \tag{24}$$

Lemma 1. Let $d_d(t) \in \mathbb{R}$ be a differentiable desired trajectory. Assume $b \neq 0$. Under the estimator design given by (16), $\hat{b}$ is an estimate that exponentially converges to b, according to Theorem 1. Setting $u = \hat{b}^{-1}(\dot{d}_d - \hat{b}ad - ke_t)$, where $k \in \mathbb{R}^+$ is a positive definite tracking gain. Under the conditions that 1) $\hat{b}(t) \neq 0$, and 2) $k_1$, $k_2$ are sufficiently large $k_1^2 \gg 4k_2$), then the system in (24) remains stable, and d converges to $d_d$ exponentially as time goes to infinity.

Proof. Define $e_t = d - d_d$, and set a Lyapunov function candidate as $$W = \frac{1}{2}e_t^2. \tag{25}$$

Taking the time derivative of (25) leads to $$\dot{W} = e_t(\dot{d} - \dot{d}_d) \tag{26}$$

$$= e_t\left(bad + b\hat{b}^{-1}(\dot{d}_d - \hat{b}ad - ke_t) - \dot{d}_d\right)$$

$$= e_t\left(-b\hat{b}^{-1}ke_t + \left(b\hat{b}^{-1} - 1\right)\dot{d}_d\right)$$

Defining $E_b = b/\hat{b} - 1$ gives $$\dot{W} = -k(E_b+1)e_t^2 + E_b\dot{d}_d e_t \tag{27}$$

By defining $C(x, t) = E_b \dot{d}_d$, equation (27) can be rewritten $$\dot{W} = -k(E_b+1)e_t^2 + C(x,t)e_t. \tag{28}$$

Let $i \in \mathbb{N}$ and $a_i$, $b_i \in \mathbb{R}^+$. We know from the estimator design and Theorem 1 that $e_b$ is exponentially decaying to zero, therefore the absolute value of $e_b$ can be upper bounded by a decaying exponential of the form $|e_b| \leq a_0 e^{-b_1 t}$. Theorem 1 also showed that $\hat{b} > 0$ and is bounded from above by some constant. Noting that $E_b = b/\hat{b} - 1 = e_b/\hat{b}$, we therefore conclude that $|E_b| \leq a_1 e^{-b_1 t}$.

Likewise, $C(x, t)$ can also be upper bounded by an decaying exponential $|C(x, t)| \leq a_2 e^{-b_2 t}$, and finally equation (28) can be upper bounded as $$\dot{W} \leq (|k|a_1 e^{-b_1 t} - |k|)e_t^2 + a_2 e^{-b_2 t}|e_t|$$

$$\leq -2(|k| - |k|a_1 e^{-b_1 t})W + \sqrt{2}a_2 e^{-b_2 t}\sqrt{W} \tag{29}$$

A closed-form solution for the ODE (29) exists, but it is quite complicated. Instead, we solve W(t) from two different initial conditions, $W(t_0) \geq 1$ and $W(t_0) < 1$. We show the solution for the system when $W(t_0) \geq 1$ will grow smaller until $W(t) < 1$, and that the solution for the system when $W(t_0) < 1$ grows smaller and is lower bounded by 0. Note then, that if $W(t_0) \geq 1$, the system will eventually enter the domain for $W(t_0) < 1$ and thus W(t) converges to 0 for all initial conditions.

For the case $W(t) \geq 1$, we have $W(t) + \sqrt{W(t)} \leq 2 W(t)$, and we can replace (29) with $$\dot{W} \leq -2|k|W + a_3 e^{-b_3 t} W \tag{30}$$

where $a_3 e^{-b_3 t} > \max(2\|K\|a_1 e^{-b_1 t}, \sqrt{2}a_2 e^{-b_2 t})$. The ODE (30) with initial condition $W(t) = W(t_0)$ has a solution $$W(t) = W(t_0)\left(e^{-\frac{2a_3 e^{\frac{2a_3}{b_3}}}{b_3}}\right)e^{-2|k|t} = W(t_0)\gamma e^{-2|k|t} \tag{31}$$

where we replace the constant term in parenthesis with $\gamma$. The solution (31) decays exponentially from any $W(t_0) > 1$, and eventually $W(t) < 1$ at some time $t_1$.

For the case $W(t) < 1$, $W(t) + \sqrt{W(t)} \leq 2\sqrt{W(t)}$, and we can replace (29) with $$\dot{W} \leq -2|K|W + a_3 e^{-b_3 t}\sqrt{W}. \tag{32}$$

The ODE (32) with initial condition $W(t) = W(t_1)$ has a solution $$W(t) = \frac{e^{-2b_3 t}[a_3 - (a_3 - (b_3 + |k|)\sqrt{W(t_1)})(e^{t(b_3 - |k|)})]^2}{(b_3 - |k|)^2}. \tag{33}$$

The solution in (33) decays to zero if $|k| \geq b_3$. Therefore W(t) is upper bounded by an exponentially decaying function for any initial condition $W(t_0)$, and is lower bounded by 0. By the Comparison Lemma [10], $W(t) \to 0$ as $t \to \infty$, which means $d \to d_d$.

Note that the requirement that $d_d(t)$ be differentiable will rule out some desired patterns, such as piece-wise linear or step changes in line width. These can be approximated as close as necessary with smooth functions, such as splines or smooth heaviside approximations.

Corollary 1

If Lemma 1 is satisfied, and $d_d$ does not satisfy $$d_d(t) = d_d(0)e^{-kt} + e^{-kt}\int_0^t k d(s)e^{-ks}ds. \tag{34}$$

for any non-instantaneous interval of time, then the set of times $\mathcal{T} = \{t \in \mathbb{R} \mid f(d,u) = 0\}$ is a measure zero set for the system described in (13).

Proof. Given $f(d, u) = ad + u$ and replacing u from Lemma 1, we have $$f(d,u) = ad + u = \hat{b}^{-1}(\dot{d}_d k(e_t)). \tag{35}$$

The proof is considered in two cases. In the first case, we assume $\dot{d}_d(t)$ is not identically equal to zero for a span of time. I.e., $\nexists \alpha \geq 0$, $\beta \leq \infty$, s. t. $\dot{d}_d(t) = 0 \forall t \in [\alpha, \beta]$. Following Lemma 1, $e_t$ exponentially converges to zero and $\hat{b} \neq 0$. From Theorem 1, $\hat{b}$ is bounded and $\hat{b}^{-1} \neq 0$. It remains to show that $\dot{d}_d - k(e_t) = 0$ only for the set of times $\mathcal{T}$, which is measure 0. Solving the differential equation $\dot{d}_d - k(d - d_d) = 0$ leads to (34). As long as $d_d(t)$ does not satisfy (34), $\nexists t$, $f(d, u)$ 0. Note that (34) is a very specific function that is unlikely to occur in practice and can be avoided by the control designer.

In the second case, we assume $\dot{d}_d(t)$ does become identically equal to zero for a span of time. I.e., $\exists \alpha \geq 0$, $\beta \leq \infty$, s.t. $\dot{d}_d(t) = 0 \ \forall t \in [\alpha, \beta]$. Because $\hat{b} \neq 0$ and $\dot{d}_d(t) = 0$, $f(d, u)$ in (35) only depends on $e_t$. Note that $e_t$ converges to zero exponentially based on Lemma 1. Therefore $e_t$ approaches 0 in the limit but is not identically zero for any noninstantaneous interval of time; i.e. for $t \in [\alpha, \beta]$, $\mathcal{T} = \{t \mid f(d, u) = 0\}$ is a measure 0 set.

Theorem 2

Consider a nonlinear system described in (13). We define a dynamic model as (15), where $\hat{b}(t)$ is the estimate of $b \neq 0$ where $\hat{b}(t=0) \geq 0$, and is updated according to (16). $k_1$ and $k_2$ are positive and sufficiently large, where $k_1^2 > 4k_2$ designed to render an overdamped second order differential equation of (22), s is defined according to (17), and T is a measure zero set based on Corollary 1. u in (24) can be designed as follows (where we can show $\hat{b}(t)$ never becomes zero)

$$u = \hat{b}^{-1}(\dot{d}_d - \hat{b}ad - ke_t) \text{ if } \hat{b} \neq 0 \tag{36}$$

Then, $\hat{b}$ and d remain stable and converge to b and $d_d$ respectively, when time goes to infinity.

Proof. Because $k_1^2 > 4k_2$ and b is always positive, $\hat{b}(t)$ with $\hat{b}(t=0)>0$ converges to b in an overdamped fashion and never crosses zero. Substituting (36) and (24) into (26) gives derivative of the Lyapunov function $$\dot{W} = -2k(E_b+1)W + \sqrt{2W}C(x,t), \hat{b} \neq 0. \quad (37)$$

This solution obeys the bounds given in (31) for $W(t) \geq 1$ and (33) for $W(t) \leq 1$. Based on Lemma 1, d remains bounded and converges to $d_d$. Based on Theorem 1, and because $\mathcal{T}$ in this case is a zero-measure set, $\hat{b}$ also converges to b independent of the input.

C. Simulation

In this section, we try to simulate and control the line width of the ink jet printing system using our approach and compare our scheme with Model Reference Adaptive Control (MRAC) and Adaptive Pole Placement Control (APPC). Finally, we simulate a set point regulation by applying our approach where MRAC and APPC cannot achieve parameter convergence.

1 Line Width Simulation

In this section, we simulate the proposed estimation and control scheme to regulate line width for both ideal and non-ideal situations.

1.1 Line Width Simulation

Figure 2:
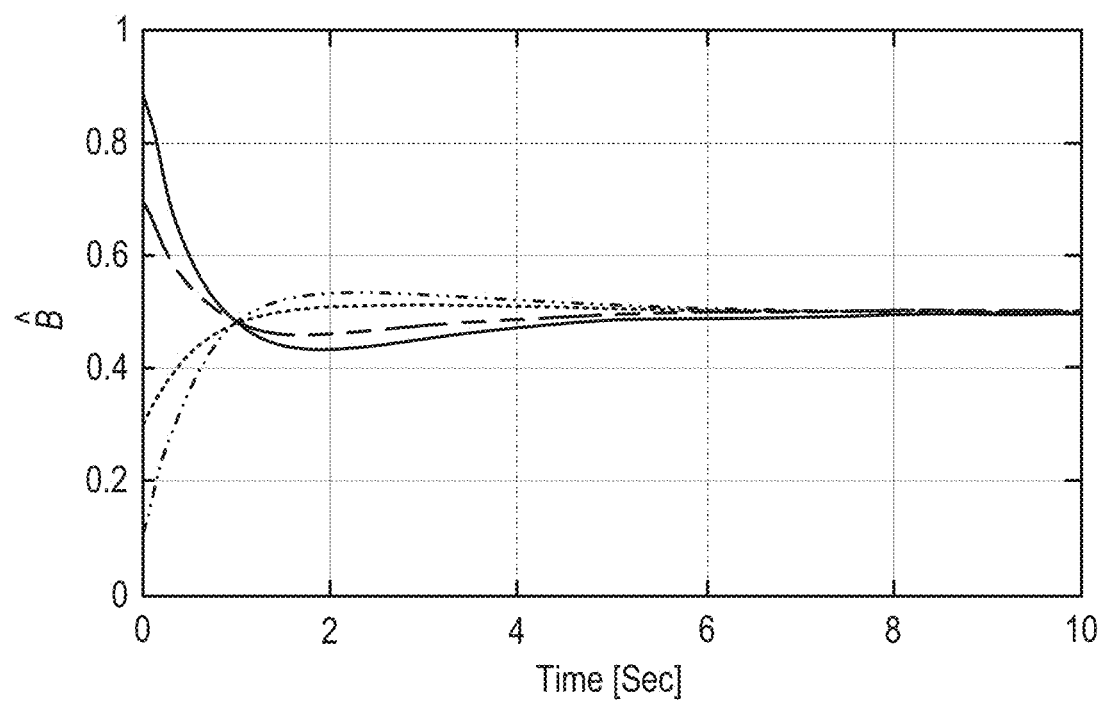
FIG. 2 is an illustration of a graph.

We first test our estimator and control scheme under ideal conditions using Simulink. We set b=0.5 and constant. The desired line diameter is a sinusoidal function $$d_d = \sin(t) + 1 \quad (38)$$

which varies between 0 and 2 mm. In the graph 200 of FIG. 2, one can see that for different initial values of $\hat{b} = \{0.1, 0.3, 0.7, 0.9\}$, the estimate converges to the correct value of b. Convergence speed can be tuned through the choice of $k_1$ and $k_2$.

Figure 3:
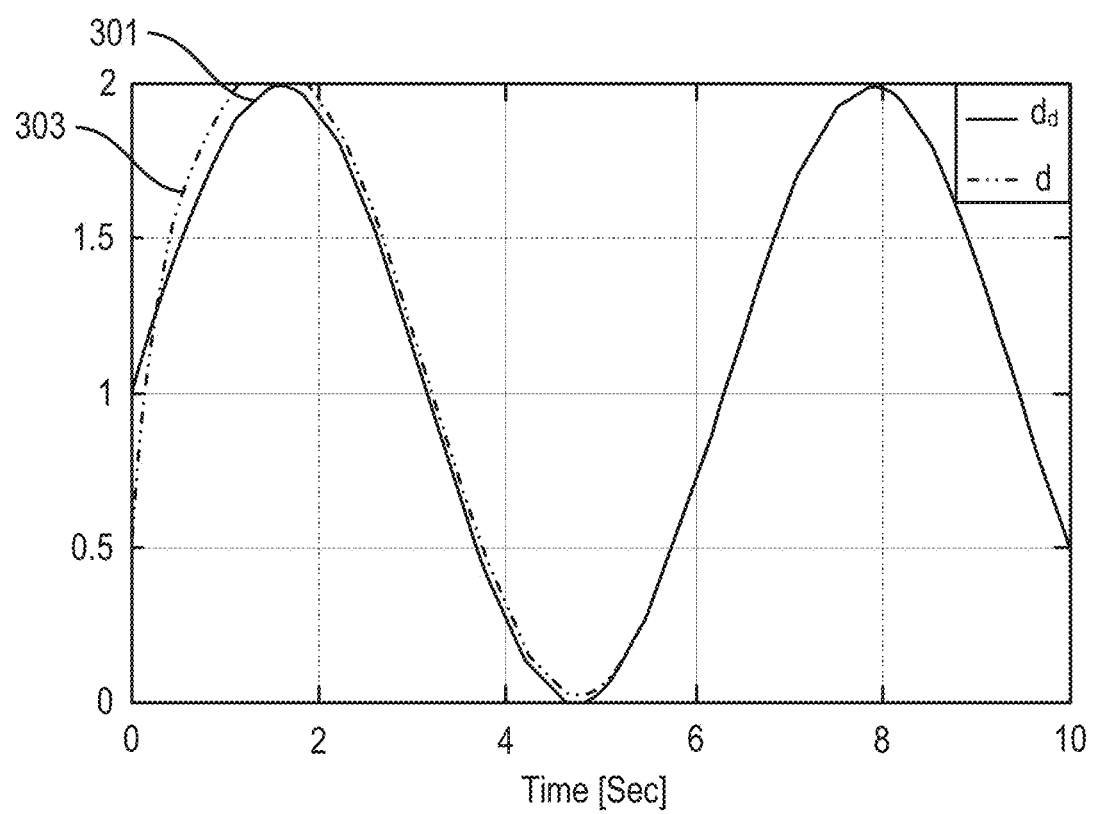
FIG. 3 is an illustration of a graph.
Figure 4:
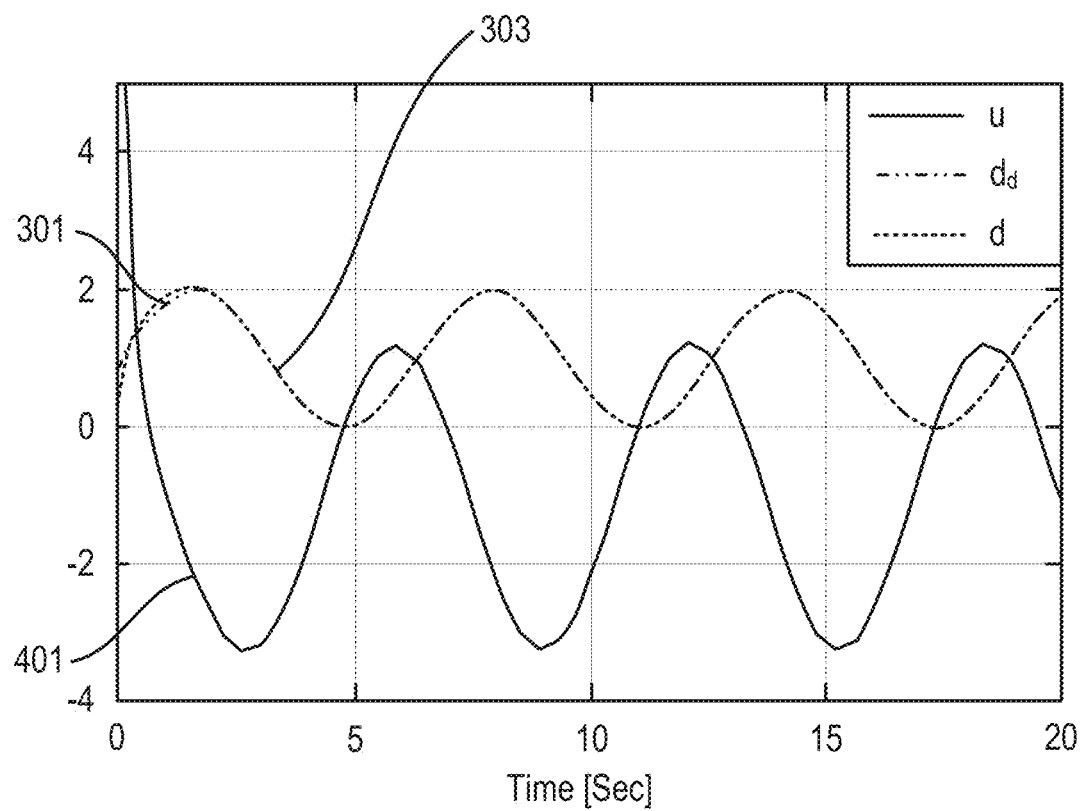
FIG. 4 is an illustration of a graph.

In the graph 300 of FIG. 3, one can see tracking performance of the control law in (36) for b=0.5. We set k=1, a=1. The line 301 is the desired line width, and the line 303 is the real width. The tracking error converges to zero as expected. In the graph 400 of FIG. 4, the line 401 depicts the control signal. Duty cycle can also be calculated from (11).

1.2 Performance with a Time-Varying Unknown Parameter

In real scenarios, b is not constant due to different factors like dirt, surface non-coherence, etc. We next simulate a situation in which b varies between 0.4 and 0.6 due to the aforementioned factors. At each time instant, we define b as a random variable with mean of 0.5 and variance 0.1 with saturation limits of 0.4 and 0.6. We used the proposed control law with $\hat{b}(t=0)=0.1$ and k=1.

Figure 5:
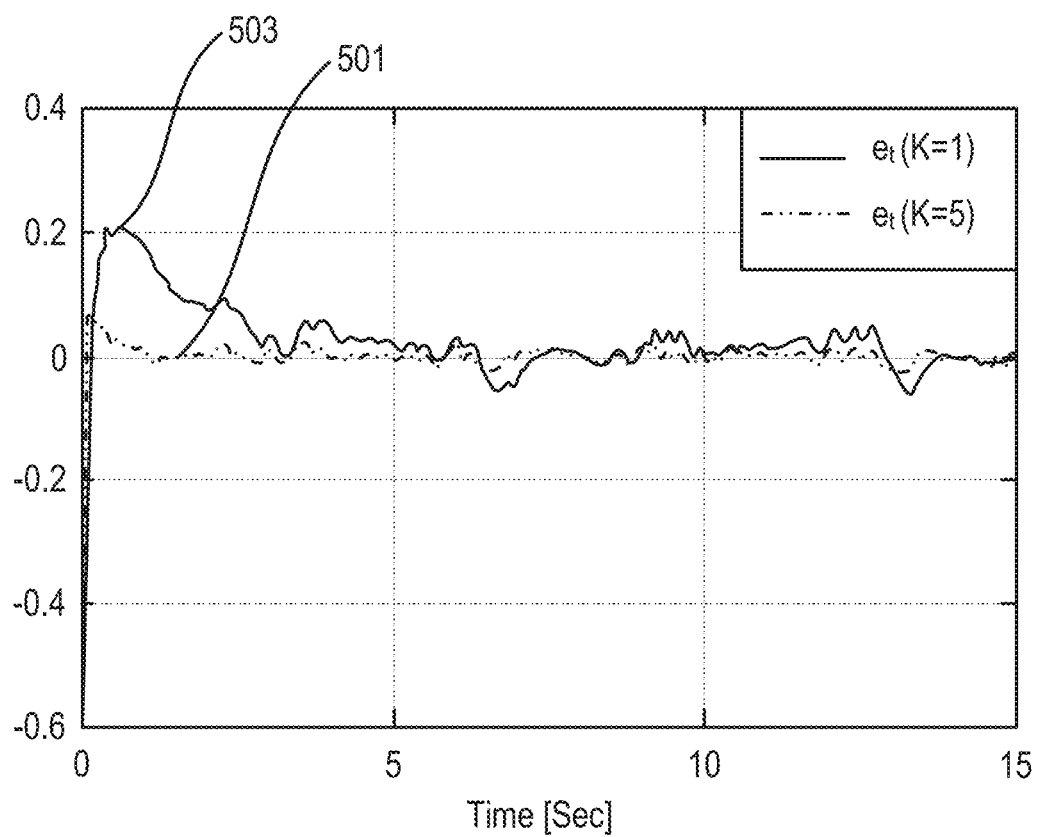
FIG. 5 is an illustration of a graph.
Figure 6:
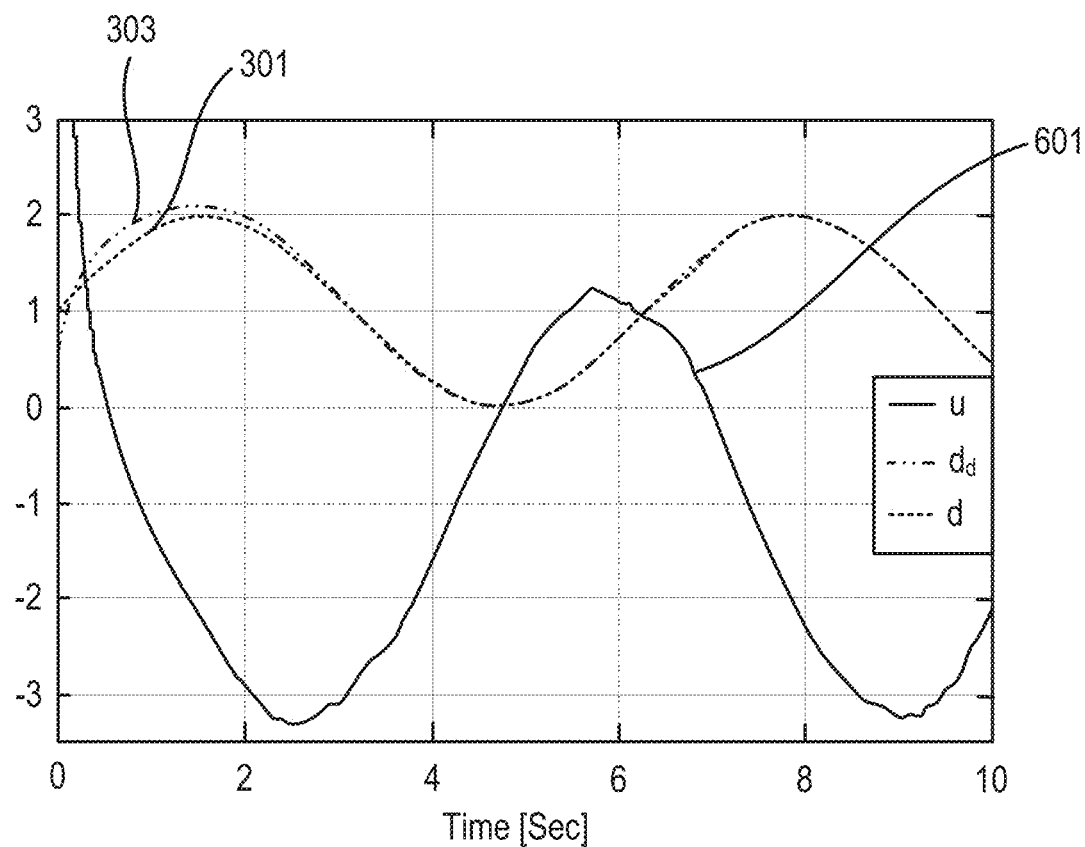
FIG. 6 is an illustration of a graph.

The graph 500 of FIG. 5 depicts tracking error with two different tracking gains 501 and 503. For both gains, the tracking errors converge to around zero with little oscillation. As expected, for the higher tracking gain 501, $e_t$ converges to zero faster. The graph 600 of FIG. 6 shows the input value 601 (which is approximately sinusoidal, as expected) and line width (desired line width 301 and real line width 303) under parameter uncertainty.

2. Parameter Estimation During Set Point Regulation

Assume the plant in (12). Here, we simulate the plant applying our adaptation law and control method. Set point is r(t)=1. One can observe in contrast to MRAC and APPC, parameter estimation error converges to zero, without PE.

D. Experiments

We present experiments of line width regulation in ink-jet deposition. In one embodiment, a Staubli TX90 robot arm has a solenoid valve is mounted to the end effector. The valve mount was designed in Solidworks and machined such that the offset from the end effector flange is precisely known. We also mounted an Intel RealSense R300 RGB-D camera on the end effector, with image processing routines measuring line width. The robot is controlled to move in a horizontal line with constant desired velocity based on the built-in firmware. Based on the line width error, the proposed estimation in Theorem 1, and control algorithm introduced in Theorem 2, equation (36), are run on C++ code on an Intel i5 laptop. Control outputs are then sent to an Arduino microcontroller, which generates a pulse train to drive the solenoid valve. Colored water under regulated pressure is then deposited. Other computing systems may be used such as the computing system 1400 disclosed in FIG. 14, for example.

E. Proposed Method

Figure 7:
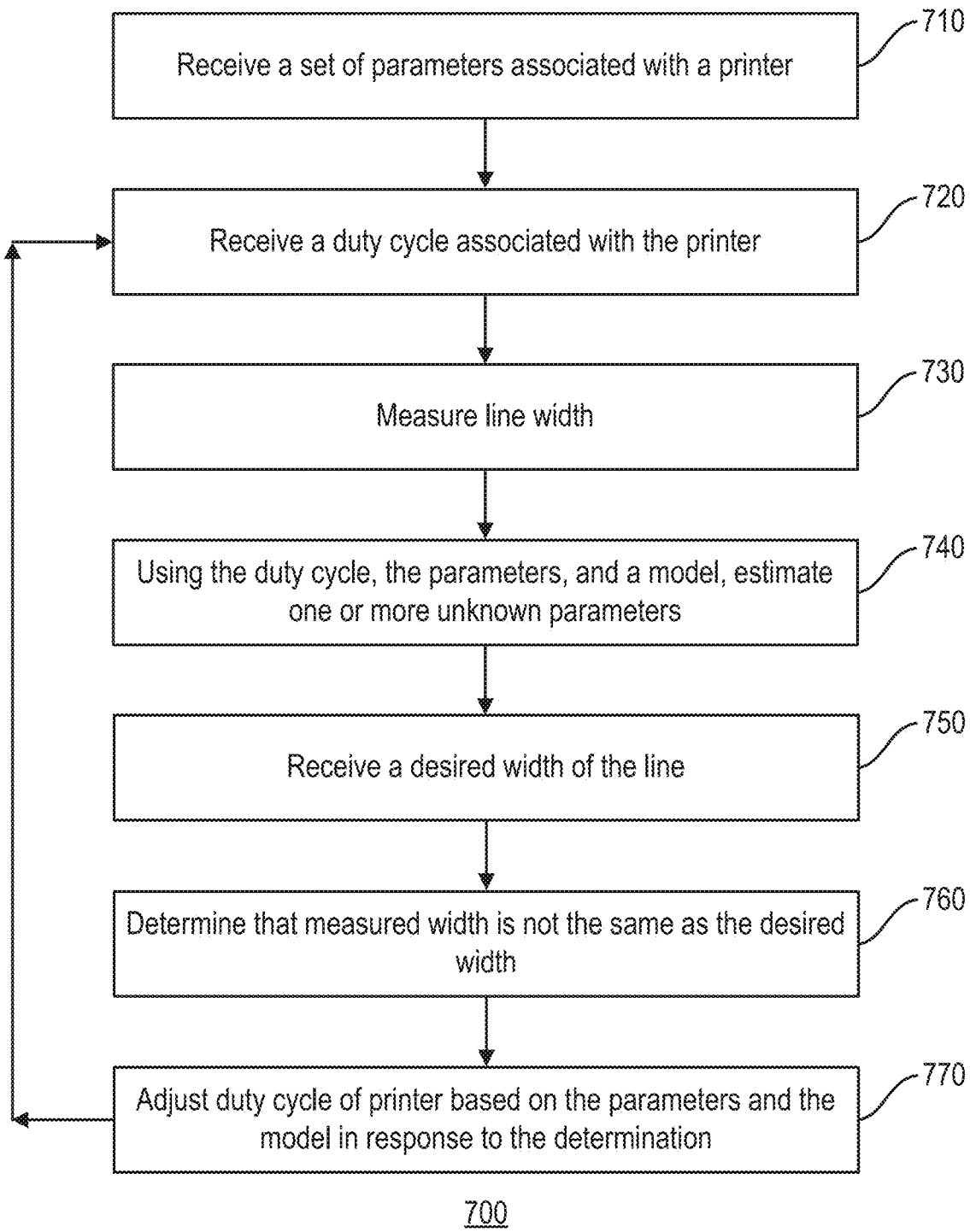
FIG. 7 is an illustration of an example method for controlling the line width of a printer.

FIG. 7 is an illustration of an example method 700 for controlling the line width of a printer. The method 700 may be implemented by a general purpose computing device in communication with a printer, such as the computing system 1400 described with respect to FIG. 14. The printer may be an inkjet printer or an extrusion printer. Other types of printers may be supported.

At 710, a set of parameters associated with a printer is received. The parameters may include one or more unknown parameters related to the characteristics of the ink and the surface that is being printed on. Because some of the unknown parameters may be difficult to measure or obtain, a single parameter may be estimated to represent the cumulative uncertainties associated with the set of parameters. The estimated single parameter may be provided by a non-linear estimator.

At 720, a duty cycle associated with the printer is received. The duty cycle may be the valve duty cycle and may represent the amount of time that the valve is open or the speed of a motor. The duty cycle of the printer may be provided by manufacturer of the printer or may be measured by a user or administrator.

At 730, the line width of the line is measured. The line width may be measured by a camera or other sensor capable of measuring the width of a line.

At 740, using the duty cycle, the parameters, and a model, one or more unknown parameters are estimated. Depending on the embodiment, steps 730 and 740 may be performed at or around the same time.

At 750, a desired width of the line is received. The desired with may be provided by a user or administrator. Depending on the embodiment, the desired width may be provided by a particular equation or function that the printer is printing or depositing on the surface.

At 760, it is determined that the measured line width is not the same as the desired line width. The determination may be made by comparing the measured line width to the desired line width. Any method for comparing line widths may be used.

At 770, a duty cycle of the printer is adjusted based on the set of parameters and the model in response to the determination. The duty cycle may be adjusted such that the line width measured by the model is closer to the desired line width. Any method for adjusting the duty cycle of a printer may be used. After adjusting the duty cycle, the method 700 may return to 720 to continue to monitor line width.

II. Trajectory Planning Over Regular General Surfaces with Application in Robot-Guided Deposition Printing

A. Introduction

Systems and methods to design and carry out trajectories over regular curved surfaces are provided. In one embodiment, constrained optimization is used to find a surface parametrization that preservers the shape of a desired curve or trajectory from 2D onto a 3D surface. Surface parametrization can be considered as a mapping from a surface to a parametric domain in lower dimensions. Surfaces that are homomorphic to a disk have a parameter space in the 2D plane. This concept lets us map a curve or trajectory defined in 2D to a geometric shape in 3D space. This mapping can result in distortion in the shape and size of the curve. As we want the pattern on the surface to be similar to the original 2D pattern, isometric (length preserving) and conformal (angle preservative) mappings are desirable to minimize distortion.

Figure 8:
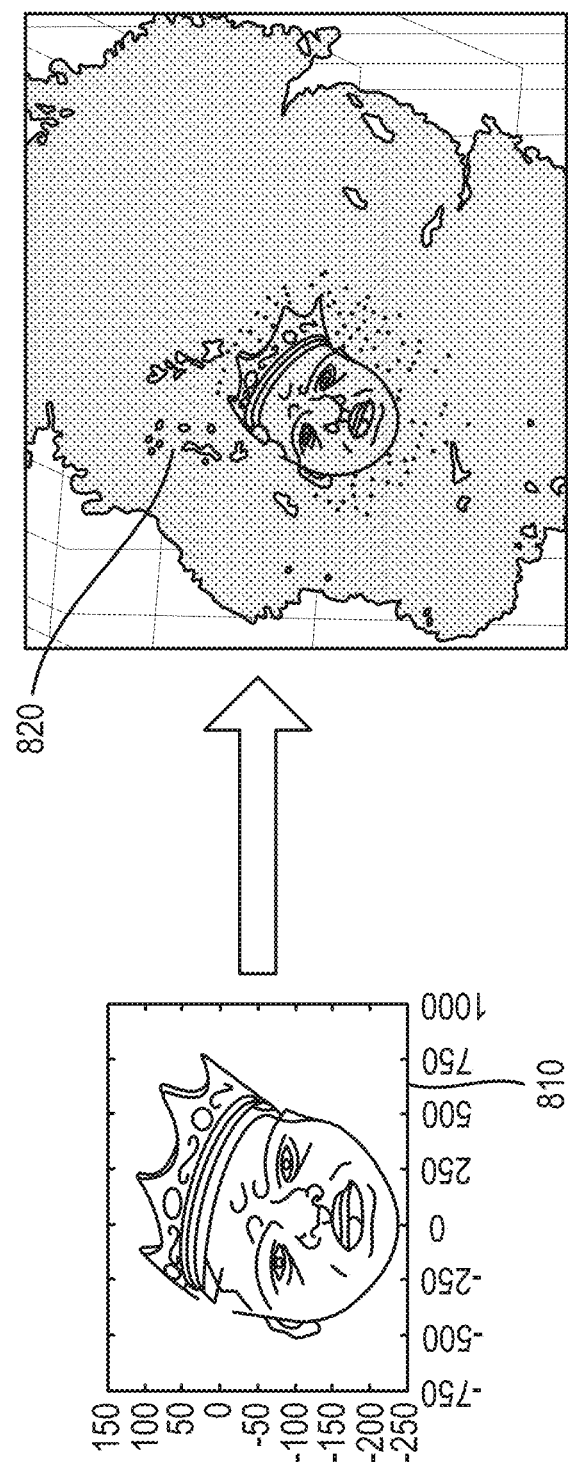
FIG. 8 is an illustration of a discontinuous parameterized curve from 2D to a regular 3D shape.

The first concept in our approach is to use a Bezier surface parameterization to fit a parametrized surface to a point cloud representation of the surface, such as from a lidar or 3D camera. A Bezier surface is initially defined using points in the point cloud as the control points in the Bezier surface definition. The control points are then adjusted through a novel optimization to provide a better surface fitting between Bezier surface and the point cloud. In this way, there is no need to know the parameterized manifold equation of the surface. The second concept is to extend the surface fitting through a novel constrained optimization procedure such that 2D curves are mapped to the surface with minimal distortions; specifically, the mapping is as close to conformal or isometric as possible. A third concept adds constraints to the optimization that enforce the mapped trajectory lie within a specific region on the surface or pass through specific points. An example of mapping a complicated, discontinuous parameterized curve 810 from 2D to a regular 3D shape 820 is shown in FIG. 8.

Focusing on our application of deposition printing, we discuss how to take the defined 3D curve and design the trajectory of a robot arm end effector to guide a nozzle along the surface while maintaining a distance to surface and remaining normal to the surface while printing/depositing materials on the curved surface.

B. Mathematical Preliminaries

In this section, we cover a variety of topics from differential geometry and surface fitting that we need in ensuing sections. These topics include regular surfaces, surface parametrization, mapping, conformal mapping, Bezier surfaces, etc.

1. Regular Surfaces and Surface Parametrization

Parametrized surfaces extend the idea of parametrized curves in Euclidean space. It can be considered as a one-to-one mapping from the surface to a specific domain. A parametrized surface is a smooth function $r_s(u, v)$: $U \to \mathbb{R}^3$ where u and v are in $\mathbb{R}$, and U is an open set in $\mathbb{R}^2$, such that for all $q \in U$, $dr_s(q)$ has rank 2, where $dr_s(q)$ is the Jacobian of $r_s$ at q.

We are specifically interested in regular surfaces on which the usual notation of calculus on a parametrized surface can be applied. The tangent plane is defined at every point on a regular surface. Consider a surface $S \subset \mathbb{R}^3$ with parametric representation $$r_s(u,v)=[x(u,v),y(u,v),z(u,v)]=r \quad (1)$$

for points [u, v] in a topological disk in $\mathbb{R}^2$ (e.g. a single connected piece with no holes), and r is short notation of the surface parametrization. This representation is regular if for each $p \in S$, there exist a neighborhood $V \subset \mathbb{R}^3$ and a map $r_s: U \to V \cap S$ of an open set $U \subset \mathbb{R}^2$ onto $V \cap S \subset \mathbb{R}^3$ such that 1. x(u, v), y(u, v), z(u, v) have continuous partial derivatives of all orders in U;
2. $r_s$ is a homeomorphism; and
3. For each q E U, the differential $dr_s$: $\mathbb{R}^2 \to \mathbb{R}3$ is one-to-one.

2. Bezier Surfaces

A regular parametrized surface can be approximated by a two-dimensional Bezier surface. A Bezier surface is a function of two independent variables given by the tensor product equation $$P(u,v)=\Sigma_{j=0}^{M}\Sigma_{i=0}^{N}P_{i,j}B_{i,N}(u)B_{j,m}(v), 0 \leq u,v \leq 1 \quad (2)$$

$$B_{i,N}(u) = \binom{N}{i} u^i (1-u)^{N-i}$$

where $P_{i,j} \in \mathbb{R}^3$ are control points, and are basis functions (or blending functions) called bi-variate Bernstein polynomials. To derive equation (2) to approximate a given surface, we need (N+1)(M+1) control points chosen from points on the surface. Larger N and M can provide better surface approximation. A Bezier surface will cross through some control points at the corners and lies in the convex hull of all of its control points. Therefore, taking surface points as control points will result in a Bezier surface spline that is not in contact with the surface at the control points. Indeed, the residual error between the Bezier surface spline and 3D surface can be notable. However, we later show that surface points can be an educated initial guess for an optimization problem to fit a Bezier surface to a given surface.

C. Mapping from a Plane onto a Surface

Many pertinent curves/trajectories can be initially designed and defined in 2D and then mapped from 2D onto a given 3D surface through knowledge of a parameterization of the surface. There can be multiple parameterizations for a given surface. We are interested in those that lead to the least possible distortion. For example, when a rectangle is mapped onto a surface, one desires the corner angles remain right. Some distortion indices, such as length, angle and area, are used to represent different mappings.

1. Curve and Surface Parametrization

The image of a map $r_s(u, v)=[x(u, v), y(u, v), z(u, v)]$ defines a surface parametrization, where $r_s: \mathbb{R}^2 \to \mathbb{R}^3$. The surface is defined by three functions x(u,v), y(u,v),z(u,v); each is a function of two variables u and v. The image of a map $r_c(\theta)=[x(\theta), y(\theta), z(\theta)]$ from parameter $\theta \in \mathbb{R}$ to a curve $r_c \subset \mathbb{R}^3$, is called curve parametrization. This parametrization can be presented in the 2D domain as $r_{cp}(\theta)=[u(\theta), v(\theta)]$, where $r_{cp} \subset \mathbb{R}^2$ is a curve in a plane such that $r_c(\theta)=r_s \circ r_{cp}(\theta)$.

As examples of $r_{cp}$ for simple, popular curves, let a, b, ω, α, β ∈ $\mathbb{R}$ be constants and $\theta \in [\alpha, \beta] \subset \mathbb{R}$.

Spiral: $r_{cp}(\theta)=\alpha\theta[\cos(\omega\theta), \sin(\omega\theta)]$

Square spiral: $r_{cp}(\theta)=\alpha\theta[|\cos(\omega\theta)|\cos(\omega\theta)+|\sin(\omega\theta)|\sin(\omega\theta)|\cos(\omega\theta)|\cos(\omega\theta)-|\sin(\omega\theta)|\sin(\omega\theta)]$ Boustrophedon path: $r_{cp}(\theta)=\alpha[\omega t,|\cos(\omega\theta)|\cos(\omega\theta)+|\sin(\omega\theta)|\sin(\omega\theta)]$ Rose: $r_{cp}(\theta)=\alpha[\cos 2\theta \cos \theta, \cos 2\theta \sin \theta]$.

2. Simultaneous Parametrization and Surface Fitting to Point Clouds

An analytic surface parametrization may be used for mapping a curve onto a surface. Taking advantage of a Bezier surface definition, we present a parametrized function of the surface based on (2), with control points that need to be optimized, such that the optimized Bezier surface represents the given surface. Consider a surface S, for which we seek a parametrization $r_s(u, v)$, as in (1). Assume a point cloud has been captured of S, such as from a LiDAR or 3D camera.

According to the Bezier formulation (with N=M=3 for clarity in presentation), which can be represented as a tensor product Bezier patch $$r_s(u, v) = \sum_{j=0}^{M=3} \sum_{k=0}^{N=3} P_{i,j} B_{i,3}(u) B_{j,3}(v) = \quad (3)$$

$$[1 \ u \ u^2 \ u^3] \underbrace{\begin{bmatrix} K_{0,0} & K_{0,1} & K_{0,2} & K_{0,3} \\ K_{1,0} & K_{1,1} & K_{1,2} & K_{1,3} \\ K_{2,0} & K_{2,1} & K_{2,2} & K_{2,3} \\ K_{3,0} & K_{3,1} & K_{3,2} & K_{3,3} \end{bmatrix}}_{K} \begin{bmatrix} 1 \\ v \\ v^2 \\ v^3 \end{bmatrix}$$

where $$K = \begin{bmatrix} 1 & 0 & 0 & 0 \\ -3 & 3 & 0 & 0 \\ 3 & -6 & 3 & 0 \\ -1 & 3 & -3 & 1 \end{bmatrix} \underbrace{\begin{bmatrix} P_{0,0} & P_{0,1} & P_{0,2} & P_{0,3} \\ P_{1,0} & P_{1,1} & P_{1,2} & P_{1,3} \\ P_{2,0} & P_{2,1} & P_{2,2} & P_{2,3} \\ P_{3,0} & P_{3,1} & P_{3,2} & P_{3,3} \end{bmatrix}}_{P} \begin{bmatrix} 1 & -3 & 3 & -1 \\ 0 & 3 & -6 & 3 \\ 0 & 0 & 3 & -3 \\ 0 & 0 & 0 & 1 \end{bmatrix} \quad (4)$$

and P is a tensor of (N+1)(M+1) control points $P_{i,j}$, $i \in \{0 \ldots N\}$, $j \in \{0 \ldots M\}$. If P is chosen from points in the point cloud, this Bezier formulation leads to a surface that only passes through some corner points and not all points in the point cloud. This is not a sufficient fit for our purposes. To get a better fit, we find an optimal P, and consequently K, such that the Bezier surface passes through a set of points in the point cloud $Pn_{i,j}$, $i \in \{0 \ldots N\}$, $j \in \{0 \ldots M\}$. To realize this optimization, let $$u_{i,j} = \frac{i}{N}, v_{i,j} = \frac{j}{M}, i \in \{0 \ldots N\}, j \in \{0 \ldots M\}$$

be evenly gridded points on the uv plane (note that (N+1)(M+1) is the number of points). Then, let $Pn_{i,j}$ be the point in the point cloud with the projection onto the uv plane closest to the point $[u_{i,j}, v_{i,j}]$.

The optimization problem of fitting $r_s(u_{i,j}, v_{i,j})$ to $Pn_{i,j}$, $i \in \{0 \ldots N\}$, $j \in \{0 \ldots M\}$, can be solved by finding the value of K that minimizes the objective function $$\underset{K}{\mathrm{argmin}} J = \sum_{j=0}^{M} \sum_{k=0}^{N} \|r_s(u_{i,j}, v_{i,j}) - Pn_{i,j}\|_2. \quad (5)$$

(recalling that $r_s(u_{i,j}, v_{i,j})$ is a function of K in (3) and (4)). To minimize (5), we employ an interior-point optimization method (specifically, we use the fmincon function in MATLAB) with $P_{i,j}=Pn_{i,j}$ as our educated initial estimate. Interior-point optimization is an approach well-known for constrained minimization. This method defines an alternative approximate problem that is easier to solve than the original problem. Although there is no constraint in our optimization problem, we prefer to apply interior-point due to its accuracy and the fact that we will face optimization problems with nonlinear constraints later in this work.

After optimization, we can treat $r_s(u, v)$ as a good mapping function from the uv plane onto the surface S, which passes through $Pn_{i,j}$. To achieve still better results, and in case we need to cover a large surface area, we apply piecewise Bezier functions and partition the surface into different subsurfaces $$r_s(u, v) = \begin{cases} r_{s_1}(u, v), u_0 \le u < u_1, v_0 \le v < v_1 \\ r_{s_2}(u, v), u_1 \le u < u_2, v_1 \le v < v_2 \\ \ldots \\ \ldots \\ r_{s_n}(u, v), u_{n-1} \le u < u_n, v_{n-1} \le v < v_n \end{cases} \quad (6)$$

and optimization is applied to each subsurface according to (5) plus a continuity condition.

Numerical optimization is sensitive to initial value, and we do not assume convexity of the optimization function. Therefore, the initial guess has a crucial role for fewer number of iterations and to avoid numerical divergence. Using points from the point cloud as the initial control points in Bezier formulation provides an educated initial guess.

3. Conformal Conditions for Fitting Surface

In addition to a good fit, minimum distortion of angles is also desirable. This helps us to keep the structure and geometry of the curve $r_c$ similar to the original $r_{cp}$ in 2D. Isometric maps are the ideal, however, in many cases there is no isometric mapping. Conformal maps are a good practical options to be considered. To apply our optimization method to preserve angle, the following statement is presented.

Theorem 1. Let $S_1$ and $S_2$ be a pair of regular surfaces. Then, a diffeomorphism $r_s$: $S_1 \to S_2$ is conformal if it preserves local angles, that is, if for all $p \in S_1$ and all x, $y \in T_p S_1$, $\langle x,y \rangle = \langle dr_p(x), dr_p(y) \rangle$, where $dr_p(x) = \langle (\nabla r)(p), x \rangle$, and $T_p S_1$ is the tangent plane of $S_1$ at the point p.

This leads to a constrained optimization problem $$\underset{K}{\mathrm{argmin}} J = \sum_{j=0}^{M} \sum_{k=0}^{N} \|r_s(u_{i,j}, v_{i,j}) - Pn_{i,j}\|_2 \quad (7)$$

$$\text{s.t:} \sum_{l=1}^{L} \|L(x_l, y_l) - L(dr_{pl}(x_l), dr_{pl}(y_l))\|_2 = 0$$

for some points $p_i$ in uv plane ($S_1$) and $x_l$, $y_l \in T_p S_1$. This optimization may be solved using an interior-point method, and leads to a mapping fit to points $Pn_{i,j}$ (first term) and preserves local angles based on the second term in (7).

4. Way Points Conditions for Fitting Surface

Having a set of desired way points $pt_i \in S$, $i=0, \ldots, n$, one might want the mapped pattern pass through them. This means, we not only impose that the pattern structure remains similar to the original pattern, but that pattern $r_{cp}(\theta)$ should visit the set of points on the surface. This optimization problem can be formulated as $$\operatorname*{argmin}_{K} J = \sum_{j=0}^{N} \sum_{k=0}^{N} \|r_s(u_{i,j}, v_{i,j}) - Pn_{i,j}\|_2 \quad (8)$$

$$\text{s.t:} \sum_{l=1}^{L} \|L(x_l, y_l) - L(dr_{pl}(x_l), dr_{pl}(y_l))\|_2 =$$

$$0 \sum_{k=0}^{n} \min(\|r_s(r_{cp}(\theta)) - pt_i\|_2) = 0$$

where $K$ need to be tuned to minimize $J$ for a good fit to the surface points. The second term preserves local angles, and last term forces the mapped pattern to go through the desired points.

D. Experimental Verification of Mapping a Curve to Point Clouds

We present experimental validation of the procedure discussed above.

1. Vision System

In some implementations, a 3D camera such as an Ensenso N35 3D camera by Image Development Systems may be used. The 3D camera uses a stereo-paired of near infrared cameras with an IR projector to generate a dot pattern. The stereo cameras uses the dot pattern to provide texture for matching points in the two images. Both projector and cameras operate at approximately 850 nm wavelength. The result is a 1280×1024 point cloud. Other sized point clouds may be used. At a standoff distance of approximately 0.5 m from a target, the point cloud depths are accurate to about 0.5 mm.

The camera may be calibrated using a calibration board, where the center of the board is considered as the origin of the point clouds generated using the camera after calibration. This coordinate frame is denoted by $F_W$, and we assume all point clouds are generated by the camera with respect to (WRT)$F_W$.

2 Point Cloud Extraction and Mapping

The above described camera may be used to capture point clouds from a plurality of shapes. In the example described herein the shapes include a sphere and a manikin face. Other shapes may be used.

Figure 9:
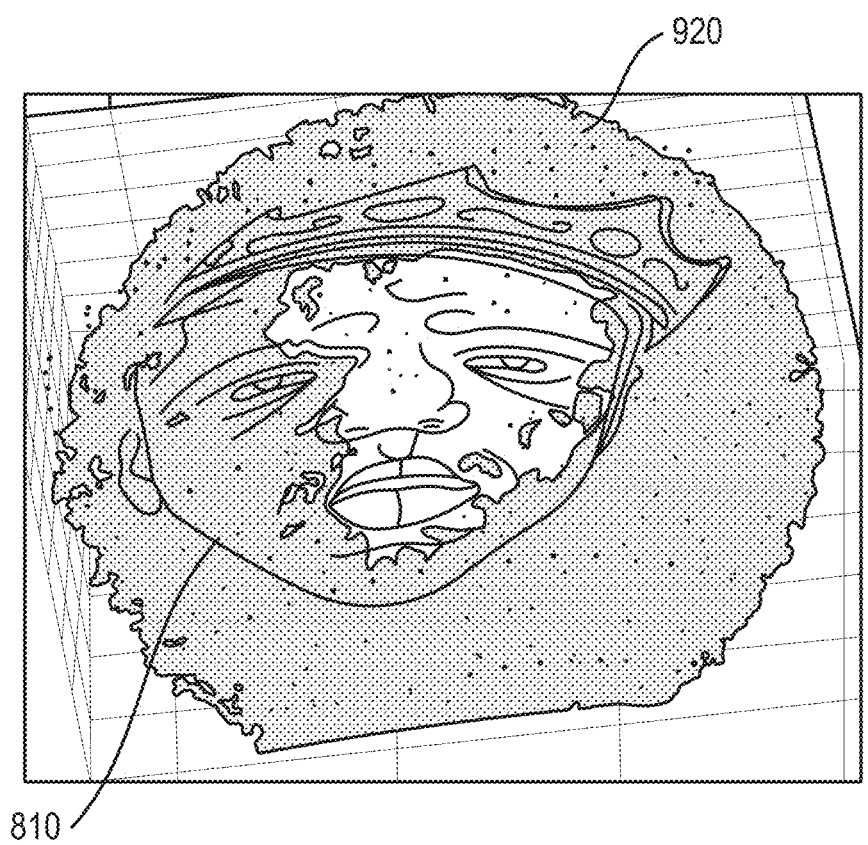
FIG. 9 is an illustration of a 2D shape mapped to a point cloud corresponding to a sphere.
Figure 10:
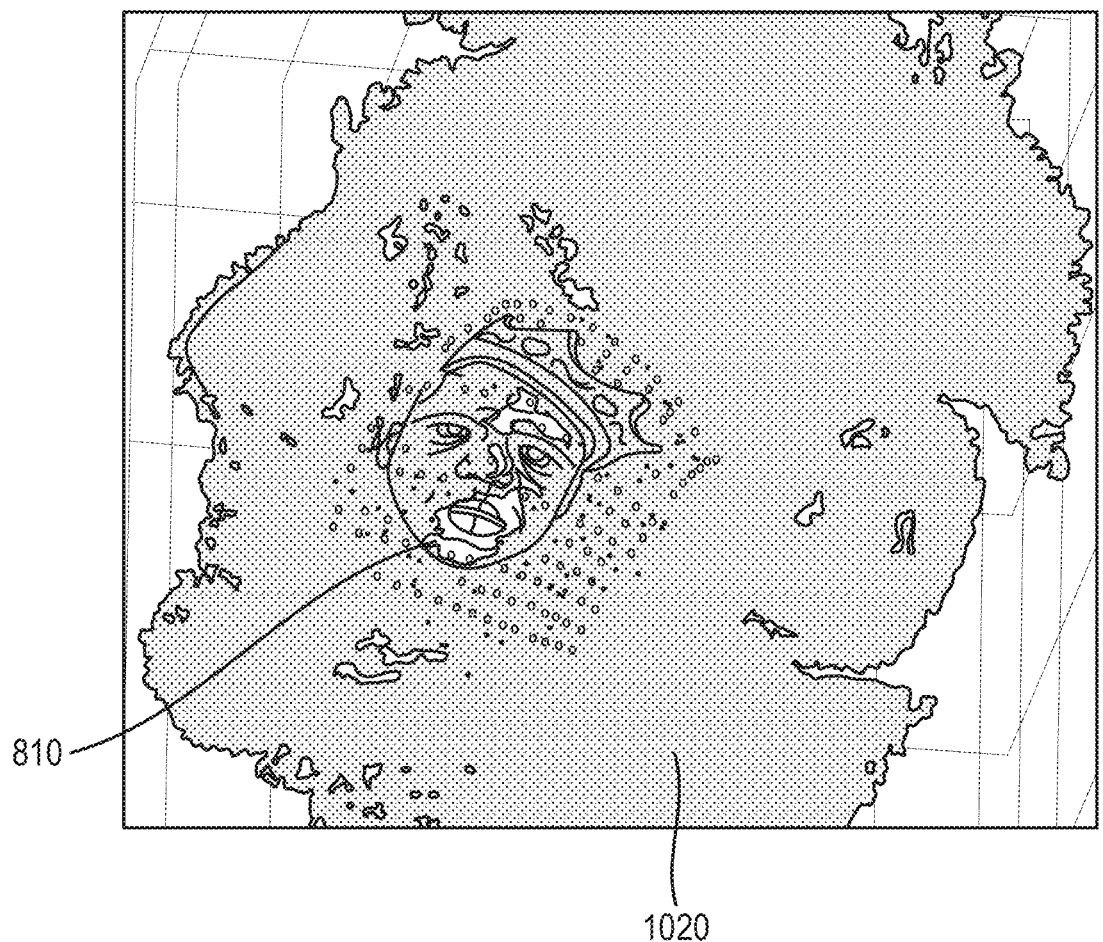
FIG. 10 is an illustration of a 2D shape mapped to a point cloud corresponding to a manikin cheek.

For each shape, 2500 evenly distributed points $Pn_{i,j}$, $i \in \{0 \ldots 49\}$, $j \in \{0 \ldots 49\}$ on the surface to cover the desired area were selected. Through these points, an educated initial guess for the control points in Bezier surface is obtained ($P_i$, $=Pn_{i,j}$). Then, by minimizing the objective function in (7), $r_s(u, v)$ is achieved as a mapping from 2D plane onto the desired shape. FIG. 9 shows the 2D shape 810 mapped to a point cloud 920 corresponding to a sphere. FIG. 10 shows the 2D shape 810 mapped to a point cloud 1020 corresponding to a manikin cheek. Based on the optimization (7), the face portrait depicted in the 2D shape 310 has a minimal distortion in angles before and after mapping. his is verified, as the angle error metric is less than 0.05 rad in all cases.

Figure 11B:
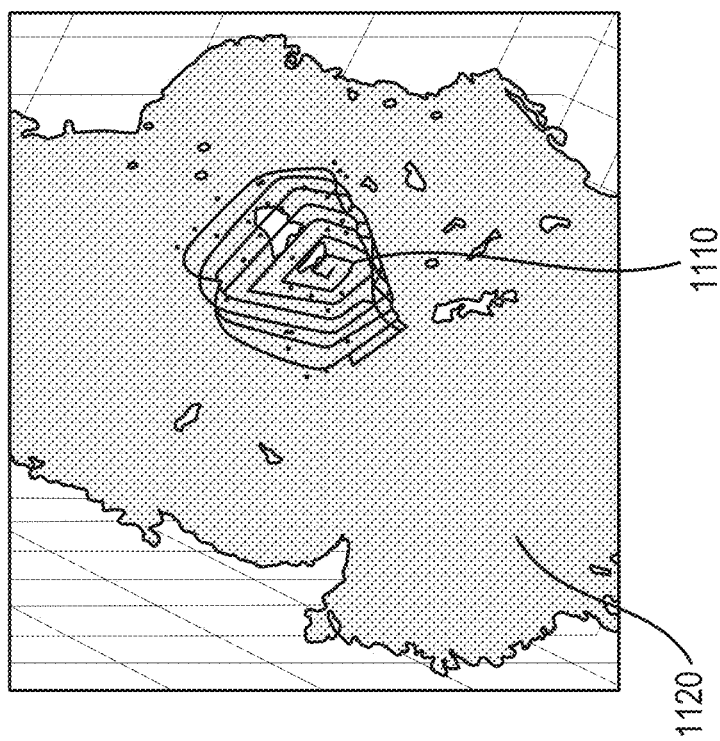
FIG. 11B is an illustration of a square spiral pattern mapped with no angle preservation.
Figure 11A:
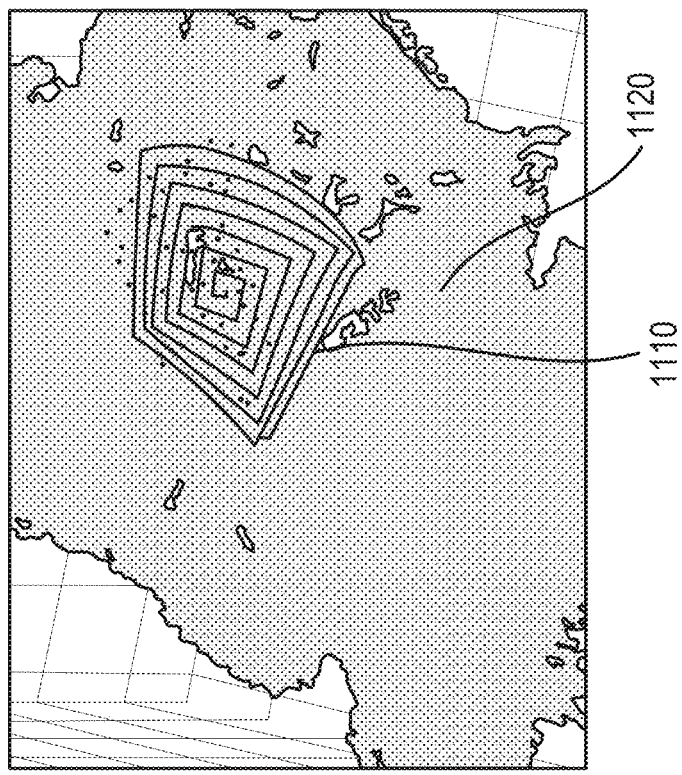
FIG. 11A is an illustration of a square spiral pattern mapped with angle preservation.

To show the necessity of the angle preservation constraint, an example of pattern placement on the manikin cheek is provided. In FIG. 11A, a square spiral pattern 1110 is mapped to a point cloud 1120 with angle preservation based on (7), while FIG. 11B shows the same pattern 1110 mapped to the point cloud 1120 with no angle preservation constraint. As one can see, right angles and the general shape of the pattern 1110 are conserved remarkably better in 11A than in 11B.

E. Path Planning and Guidance of a Robot End Effector for Printing Tasks

In order to use a robot to conduct deposition printing, it may be necessary to use the mapped curve to define a robot trajectory or path. This trajectory must move the print head nozzle along the curve, while maintaining a specific distance to the surface and keeping the nozzle normal to the surface. Similar tasks would be needed for guiding a UAV over a curved surface while keeping sensors aimed at the ground.

In one embodiment, the robot used is a Staubli TX90, with 6 rotational joints. Other robots may be used. A mount for the nozzle was machined, with the offset from the robot flange to the nozzle known through the CAD design. We considered the nozzle tip as the robot end effector. As the camera is calibrated, point clouds are captured WRT board frame ($F_W$). To map trajectories defined in $F_W$ to the robot frame $F_R$, we use the transformation $$\begin{bmatrix} {}^{F_R}_{F_W}R & {}^{F_R}_{F_W}p \\ 0 & 1 \end{bmatrix},$$

where ${}^{F_R}_{F_W}R \in SO(3)$ and ${}^{F_R}_{F_W}p \in \mathbb{R}^3$ are the orientation and position of $F_W$ origin WRT $F_R$, respectively.

After coordinate transformation to the robot frame, it is desirable to set the z-axis of the nozzle normal to the surface, and nozzle top position equal to the mapped curve position on the surface plus a z-axis position offset. We define a rotation matrix based on Euler angles as $$\begin{aligned}{}^{F_R}_{F_E}R = \\ R_X(\alpha) R_Y(\beta) R_Z(\gamma) = \begin{bmatrix} C\beta C\gamma & -C\beta S\gamma & -S\beta \\ C\alpha S\gamma - C\gamma S\alpha S\beta & C\alpha C\gamma + S\alpha S\beta S\gamma & -S\alpha C\beta \\ S\alpha S\gamma + C\alpha S\beta C\gamma & S\alpha C\gamma - C\alpha S\beta S\gamma & C\alpha C\beta \end{bmatrix}\end{aligned} \quad (9)$$

where, C and S stand for cos and sin. Recall that the columns of ${}^{F_R}_{F_E}R$ are axes of the end effector frame $F_E$ in $F_R$. The normal vector $n \in \mathbb{R}^3$ of the curve on the surface defined in (1) can be calculated as $$a_n = \left[ \frac{\partial x(u,v)}{\partial u} \frac{\partial y(u,v)}{\partial u} \frac{\partial z(u,v)}{\partial u} \right]^T \quad (10)$$

$$b_n = \left[ \frac{\partial x(u,v)}{\partial v} \frac{\partial y(u,v)}{\partial v} \frac{\partial z(u,v)}{\partial v} \right]^T$$

$$n = \frac{a_n \times b_n}{\sqrt{|a_n|^2 |b_n|^2 - |a_n \cdot b_n|^2}}$$

where u and v are parameterized as [u, v]=[u(θ), v(θ)] for θ ⊂ ℝ. By setting the last column of the rotation matrix in (9) to n, we set the z direction of the end effector equal to surface normal vector; α and β are then derived as $$\alpha=\text{atan } 2(-n_2,n_3), \beta=\text{atan } 2(n_1 \sin(\alpha),n_2) \quad (11)$$

As the end effector moves along the curve, we need to avoid extreme rotation of the final robot joint to prevent tangling/pulling the tubes leading to the nozzle and prevent the robot from hitting its joint limit. We achieve this by setting the second element of the first column of the rotation matrix in (9) (i.e., the x-axis of the end effector WRT $F_R$) equal to zero. This enforces the end effector x-axis to remain tangent to the xz plane in $F_R$. This leads to $$\gamma=\text{atan } 2(\sin(\alpha)\sin(\beta), \cos(\gamma)). \quad (12)$$

Given α, β, γ and n, the axes $F_E$ are uniquely defined for every point on the curve.

Figure 12:
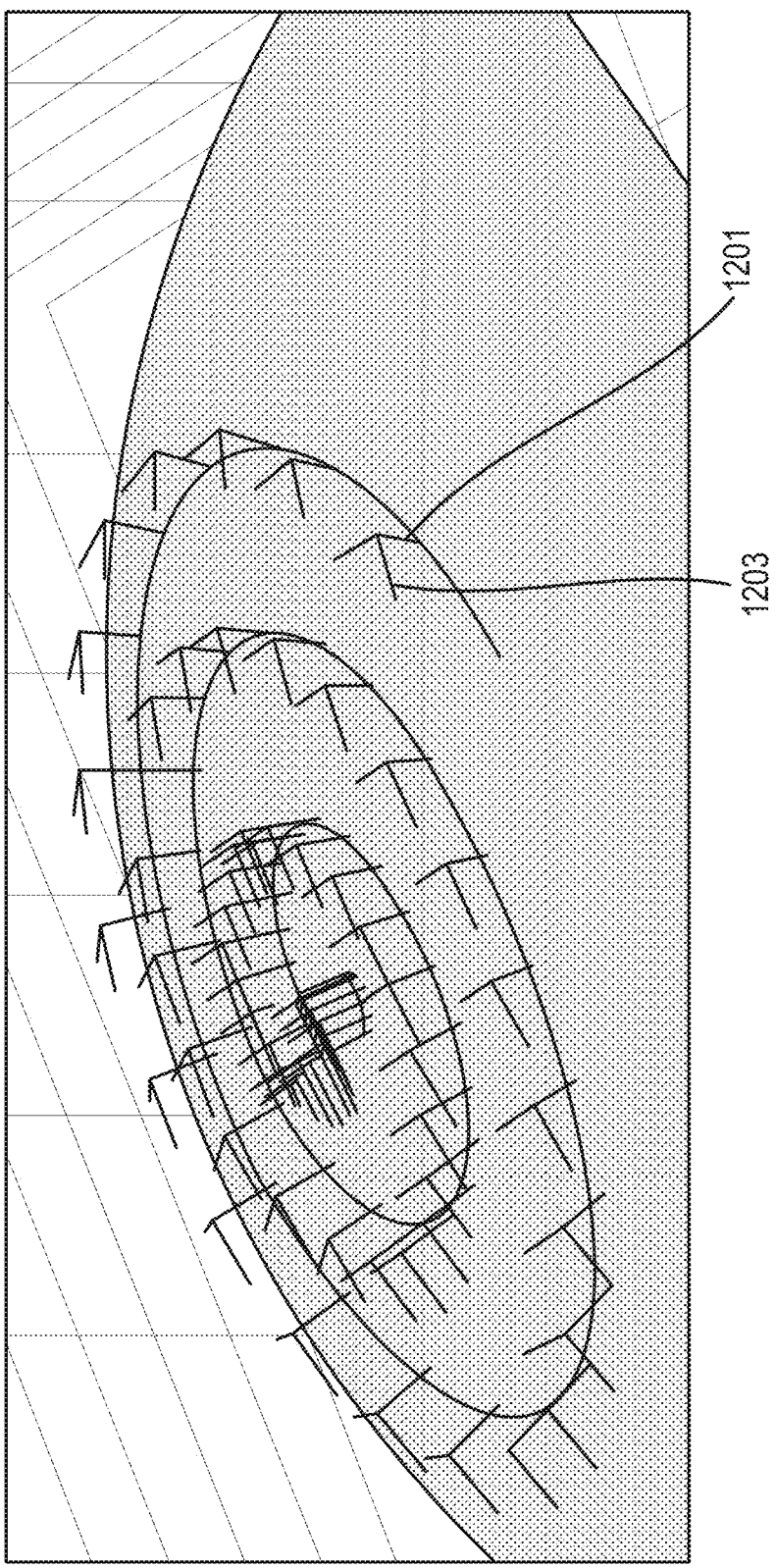
FIG. 12 illustrates the trajectory of the end effector frame tracing a spiral curve on a sphere.

FIG. 12 illustrates the trajectory of the end effector frame tracing a spiral curve on a sphere, where the axes 1201 is the z-axis along the surface normal and the axis 1203 is the x-axis, which always stays aligned with the same plane. Knowing the rotation (R) and position ($r_s$(u, v)=p with an offset along the surface normal vector), one knows desired robot end effector position and orientation to draw the desired path.

F. Proposed Method

Figure 13:
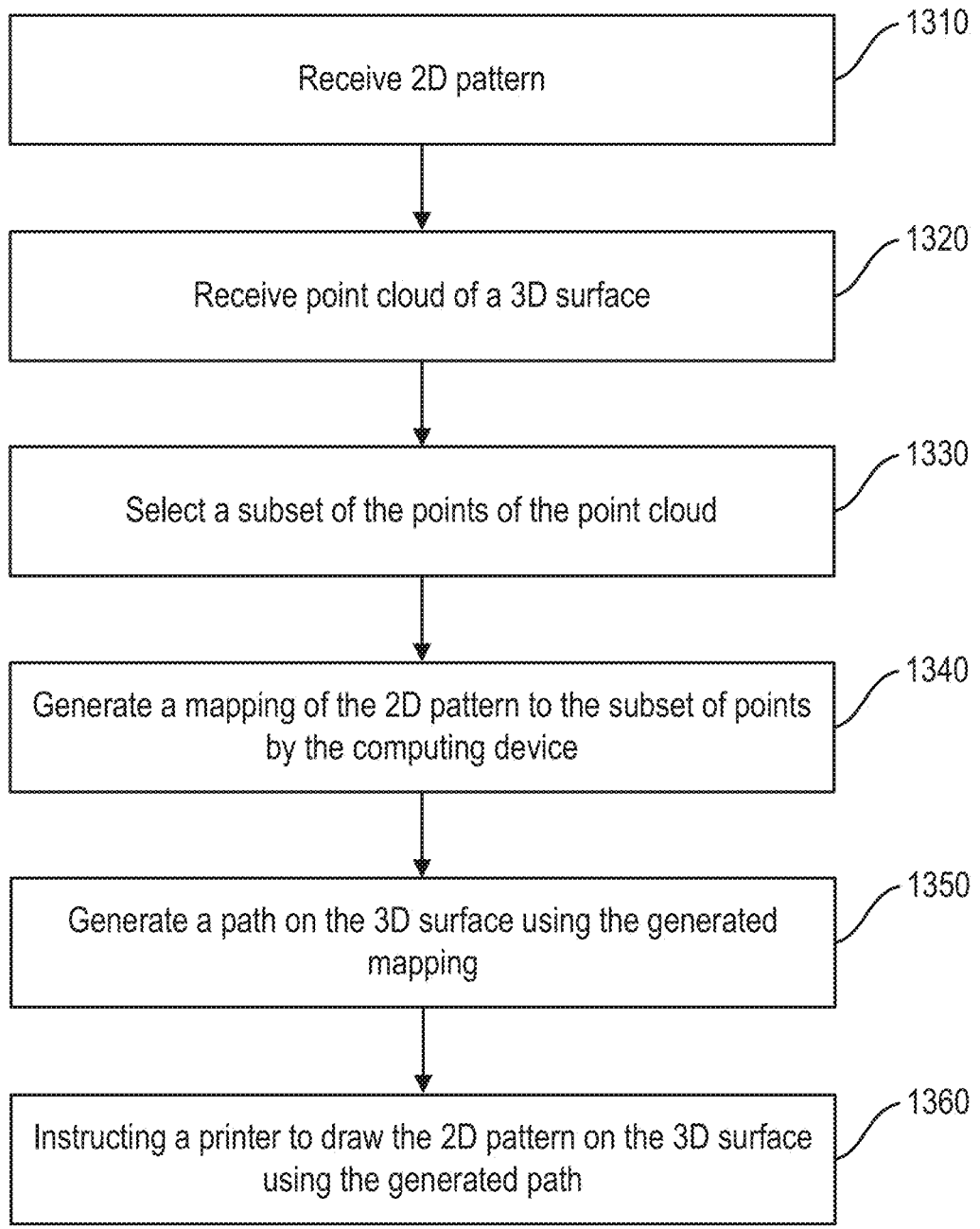
FIG. 13 is an illustration of a method for printing a 2D patterns on a 3D surface.

FIG. 13 is an illustration of a method 1300 for printing a 2D patterns on a 3D surface. The method 1300 may be performed by one or more general purpose computing devices such as the computing system 1400.

At 1310, a 2D pattern is received. The 2D pattern may be an image and may be received from a user or administrator. Any type of 2D pattern may be supported.

At 1320, a point cloud of a 3D surface is received. The point cloud may be received from a 3D camera and may be a 1024×1024 point cloud. Other types of point clouds may be supported. The point cloud may have a coordinate frame that is denoted as $F_W$.

At 1330, a subset of the points of the point cloud are selected. The subset of points are the initial control points and may be selected as described above for placing the 2D pattern on the 3D surface.

At 1340, a mapping of the 2D pattern to the subset of points is generated. The mapping $r_s$(u, v) of the 2D pattern may be mapping from the 2D pattern to the points of the control points corresponding to the 3D surface. The mapping may be generated by minimizing the objective function described at (7). Other methods may be used. The mapping may be both isometric and conformal.

At 1350, a path is generated on the 3D surface using the mapping. The path may be a trajectory that will be followed by the print head nozzle of the printer over the 3D surface while maintaining a specified distance from the 3D surface. The path or trajectory may be determined as described above. In some embodiments, the path may be defined as a .csv file that lists the coordinate of the Cartesian frame [(x,y,z,α,β,γ)] at each time step. Other types of file or definitions may be used.

At 1360, a printer is instructed to draw the 2D pattern on the 3D surface using the generated path. Any method for providing instructions to a printer or robot may be used.

Figure 14:
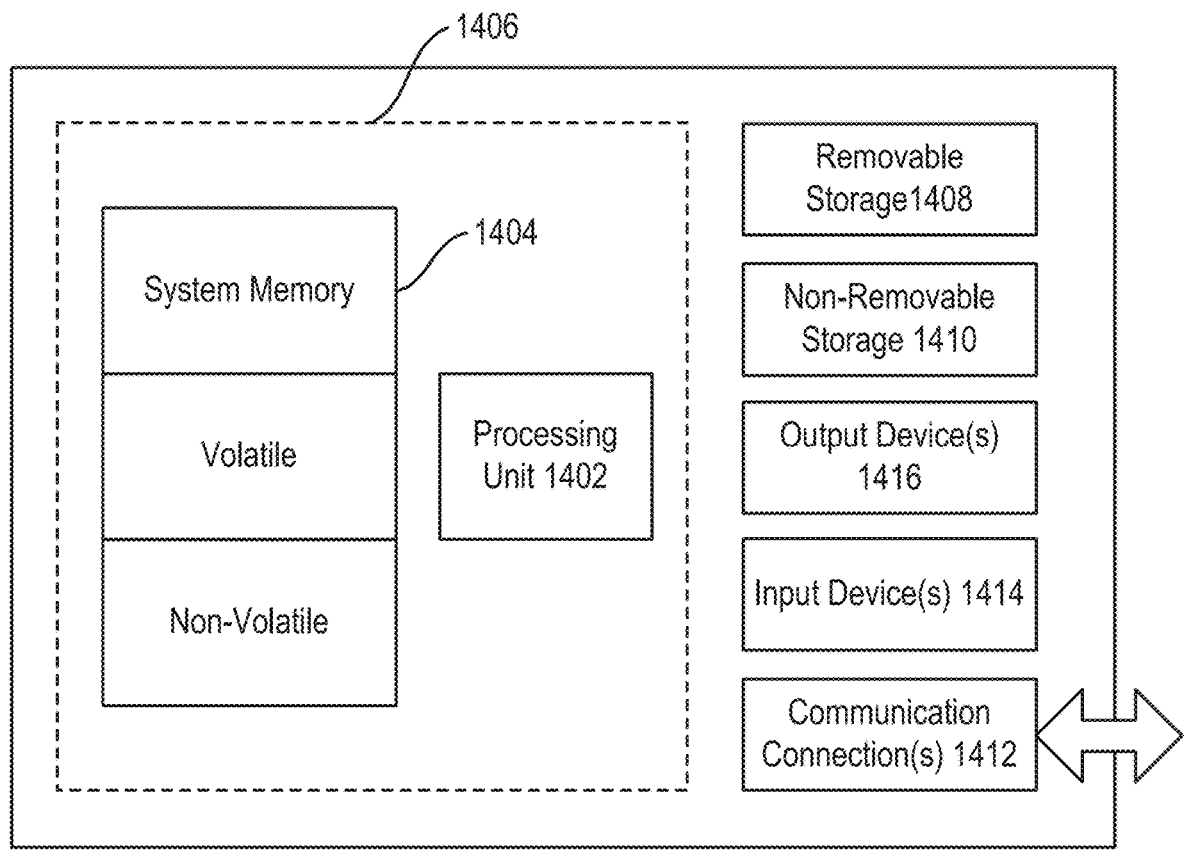
FIG. 14 illustrates an example computing device.

FIG. 14 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 14, an exemplary system for implementing aspects described herein includes a computing device, such as computing device 1400. In its most basic configuration, computing device 1400 typically includes at least one processing unit 1402 and memory 1404. Depending on the exact configuration and type of computing device, memory 1404 may be volatile (such as random access memory (RAM)), non-volatile (such as read-only memory (ROM), flash memory, etc.), or some combination of the two. This most basic configuration is illustrated in FIG. 14 by dashed line 1406.

Computing device 1400 may have additional features/functionality. For example, computing device 1400 may include additional storage (removable and/or non-removable) including, but not limited to, magnetic or optical disks or tape. Such additional storage is illustrated in FIG. 14 by removable storage 1408 and non-removable storage 1410.

Computing device 1400 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1404, removable storage 1408, and non-removable storage 1410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 1400.

Computing device 1400 may contain communication connection(s) 1412 that allow the device to communicate with other devices. Computing device 1400 may also have input device(s) 1414 such as a keyboard, mouse, pen, voice input device, touch input device, etc. Output device(s) 1416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for printing a 2D pattern on a 3D surface comprising:
   receiving a 2D pattern by a computing device;
   causing a LiDAR device to capture a point cloud of a 3D surface by the computing device, wherein the point cloud comprises a plurality of points;
   selecting a subset of the points of the point cloud by the computing device;
   generating a mapping of the 2D pattern to the subset of points by the computing device;
   generating a path on the 3D surface using generated mapping by the computing device; and
   causing a printer to draw the 2D pattern on the 3D surface using the generated path by the computing device.

2. The method of claim 1, wherein generating the mapping of the 2D pattern to subset of points comprises solving an optimization problem.

3. The method of claim 1, wherein the mapping is isometric and conformal.

4. The method of claim 1, wherein generating the mapping of the 2D pattern to subset of points comprises solving the optimization problem:

$$\underset{K}{\mathrm{argmin}} J = \sum_{j=0}^{M}\sum_{i=0}^{N}\|r_s(u_{i,j}, v_{i,j}) - Pn_{i,j}\|_2$$

$$\text{s.t: } \sum_{l=1}^{L}\|L(x_l, y_l) - L(dr_{pl}(x_l), dr_{pl}(y_l))\|_2 = 0.$$

5. The method of claim 1, wherein the path comprises a trajectory that to be followed by a print head nozzle of the printer over the 3D surface while the print head nozzle maintains a specified distance from the 3D surface.

6. The method of claim 1, wherein the path comprises coordinate of a Cartesian frame [(x,y,z,α,β,γ)] at each time step of a plurality of time steps.

7. A system for printing a 2D pattern on a 3D surface comprising:
   a LiDAR device or a 3D câmera;
   a printer; and
   a computing device adapted to:
      receive a 2D pattern;
      cause the LiDAR device or the 3D camera to capture a point cloud of a 3D surface, wherein the point cloud comprises a plurality of points;
      select a subset of the points of the point cloud;
      generate a mapping of the 2D pattern to the subset of points;
      generate a path on the 3D surface using generated mapping; and
      cause the printer to draw the 2D pattern on the 3D surface using the generated path.

8. The system of claim 7, wherein generating the mapping of the 2D pattern to subset of points comprises solving an optimization problem.

9. The system of claim 7, wherein the mapping is isometric and conformal.

10. The system of claim 7, wherein generating the mapping of the 2D pattern to subset of points comprises solving the optimization problem:

$$\underset{K}{\mathrm{argmin}} J = \sum_{j=0}^{M}\sum_{i=0}^{N}\|r_s(u_{i,j}, v_{i,j}) - Pn_{i,j}\|_2$$

$$\text{s.t: } \sum_{l=1}^{L}\|L(x_l, y_l) - L(dr_{pl}(x_l), dr_{pl}(y_l))\|_2 = 0.$$

11. The system of claim 7, wherein the path comprises a trajectory that to be followed by a print head nozzle of the printer over the 3D surface while the print head nozzle maintains a specified distance from the 3D surface.

12. The system of claim 7, wherein the path comprises coordinate of a Cartesian frame [(x,y,z,α,β,γ)] at each time step of a plurality of time steps.

13. A computer-readable medium with computer-executable instructions stored thereon that when executed by a computing device cause the computing device to:
   receive a 2D pattern;
   cause a LiDAR device or 3D camera to capture a point cloud of a 3D surface, wherein the point cloud comprises a plurality of points;
   select a subset of the points of the point cloud;
   generate a mapping of the 2D pattern to the subset of points;
   generate a path on the 3D surface using generated mapping; and cause a printer to draw the 2D pattern on the 3D surface using the generated path.

14. The computer-readable medium of claim 13, wherein generating the mapping of the 2D pattern to subset of points comprises solving an optimization problem.

15. The computer-readable medium of claim 13, wherein the mapping is isometric and conformal.

16. The computer-readable medium of claim 13, wherein generating the mapping of the 2D pattern to subset of points comprises solving the optimization problem:

$$\operatorname*{argmin}_{K} J = \sum_{j=0}^{M} \sum_{i=0}^{N} \|r_s(u_{i,j}, v_{i,j}) - Pn_{i,j}\|_2$$

$$\text{s.t: } \sum_{l=1}^{L} \|L(x_l, y_l) - L(dr_{pl}(x_l), dr_{pl}(y_l))\|_2 = 0.$$

17. The computer-readable medium of claim 13, wherein the path comprises a trajectory that to be followed by a print head nozzle of the printer over the 3D surface while the print head nozzle maintains a specified distance from the 3D surface.

\* \* \* \* \*